US012651421B2

(12) United States Patent
Olia et al.

(10) Patent No.: US 12,651,421 B2
(45) Date of Patent: Jun. 9, 2026

(54) SYSTEM AND METHOD FOR PROVIDING INFORMATION IN EXTENDED REALITY ENVIRONMENT

(71) Applicants:Michael W. Olia, Dana Point, CA (US); Marnie J. Olia, Dana Point, CA (US)

(72) Inventors: Michael W. Olia, Dana Point, CA (US); Marnie J. Olia, Dana Point, CA (US)

( * ) Notice: Subject to any disclaimer, the term of this patent is extended or adjusted under 35 U.S.C. 154(b) by 242 days.

(21) Appl. No.: 18/321,295

(22) Filed: May 22, 2023

(65) Prior Publication Data

US 2023/0377301 A1 Nov. 23, 2023

Related U.S. Application Data

(60) Provisional application No. 63/365,099, filed on May 20, 2022.

(51) Int. Cl.
| | |
|---|---|
| *G06T 19/20* | (2011.01) |
| *G06Q 20/12* | (2012.01) |
| *G06Q 20/42* | (2012.01) |

(52) U.S. Cl.
CPC ........... *G06T 19/20* (2013.01); *G06Q 20/123* (2013.01); *G06Q 20/42* (2013.01); *G06T 2219/2004* (2013.01)

(58) Field of Classification Search
CPC ........... G06T 19/20; G06T 2219/2004; G06Q 20/123; G06Q 20/42
USPC ........................................................ 345/419
See application file for complete search history.

(56) References Cited

U.S. PATENT DOCUMENTS

| | | | |
|---|---|---|---|
| 11,567,627 B2 * | 1/2023 | Day ...................... | G06F 3/0485 |
| 11,928,758 B2 * | 3/2024 | Alston ................. | G06T 11/001 |
| 2019/0155529 A1 * | 5/2019 | Linke ................... | G06F 3/0679 |
| 2023/0109753 A1 * | 4/2023 | Alston .............. | G06Q 30/0643 |
| | | | 345/633 |

* cited by examiner

*Primary Examiner* — Thomas J Lett
(74) *Attorney, Agent, or Firm* — Benjamin Diederich

(57) ABSTRACT

A system may be provided for a providing information in extended reality environment. The system receives a first publisher input via a publisher device. The first publisher input includes at least location information and first information associated with at least one of a service or an object. The system further creates a virtual object based on the received first information. The created virtual object is to be rendered in an extended reality (XR) environment corresponding to a physical environment that includes a location specified in the location information. The system further publishes the created virtual object at a first virtual location in the XR environment to be viewed via a subscriber device. The first virtual location corresponds to the location specified in the location information.

5 Claims, 8 Drawing Sheets

400

700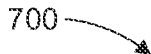

Receive first publisher input via publisher device, wherein first publisher input includes at least location information and first information associated with at least one of service or object 702

Create virtual object based on received first information, wherein created virtual object is to be rendered in extended reality (XR) environment corresponding to physical environment that includes location specified in location information 704

Publish created virtual object at first virtual location in XR environment to be viewed via subscriber device, wherein first virtual location corresponds to location specified in location information 706

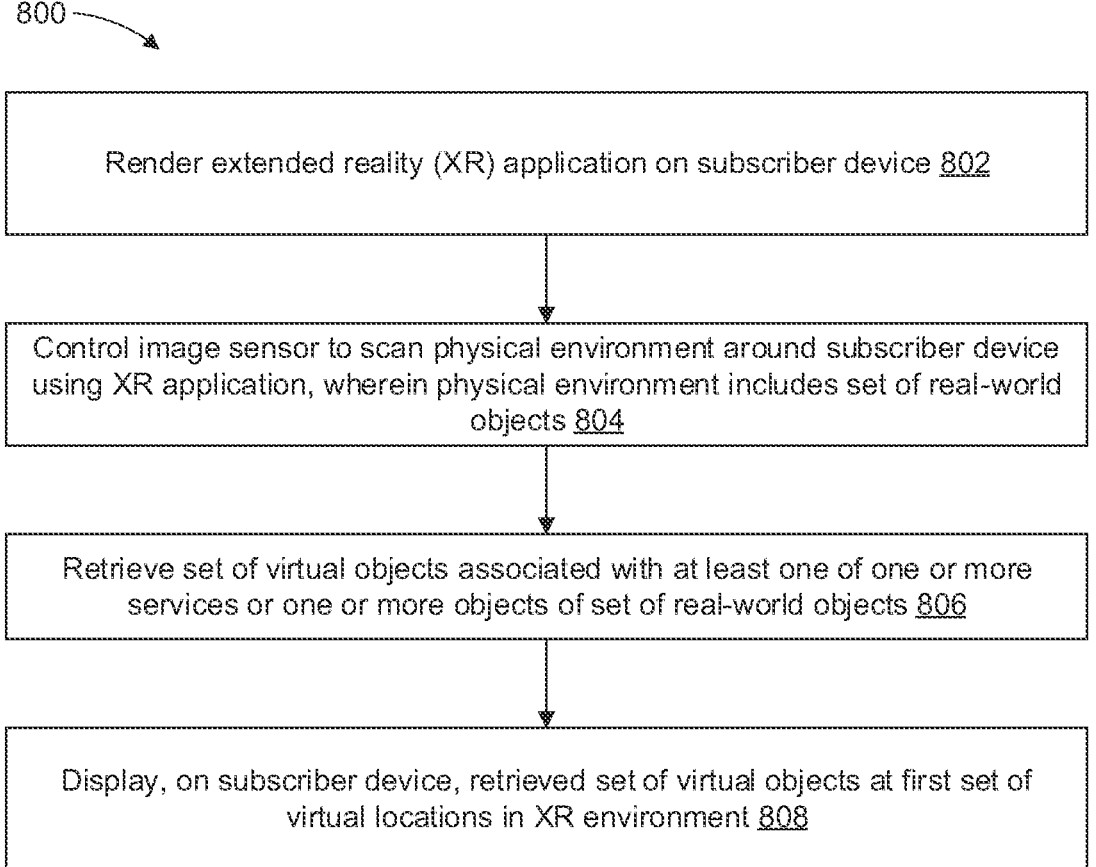

Render extended reality (XR) application on subscriber device 802

Control image sensor to scan physical environment around subscriber device using XR application, wherein physical environment includes set of real-world objects 804

Retrieve set of virtual objects associated with at least one of one or more services or one or more objects of set of real-world objects 806

Display, on subscriber device, retrieved set of virtual objects at first set of virtual locations in XR environment 808

FIG. 8

SYSTEM AND METHOD FOR PROVIDING INFORMATION IN EXTENDED REALITY ENVIRONMENT

CROSS-REFERENCE TO RELATED APPLICATIONS

This application claims the benefit of U.S. Provisional Application No. 63/365,099, filed on May 20, 2022, the teachings of which are expressly incorporated by reference.

TECHNOLOGICAL FIELD

The present disclosure relates generally to providing information in extended reality (XR) environment, and more specifically to systems and methods for providing information in the XR environment that allow users to broadcast and receive information overlaid in spaces such as open air or sky and further allows for applications such as buying/selling/exchanging of physical items as well as virtual items in the XR environment.

BACKGROUND

With advancement in field of computer graphics, applications associated with extended Reality (XR) that may include augmented reality (AR), virtual reality (VR) and mixed reality (MR) are on a rise. In the AR, digital information is overlaid onto physical world, creating augmented reality for the user whereas the VR involves creating an entirely digital environment that users can experience through a headset or other immersive technology. The MR combines elements of both the AR and the VR, allowing users to interact with digital objects that are placed realistically within their physical environment. Thus, the XR experiences allow users to interact with digitally-created environments and objects, which can be used for application such as entertainment, training, education, healthcare, and much more.

Now-a-days, a concept of metaverse is also rising rapidly. The metaverse refers to a concept of a shared, virtual space that spans across various technologies and platforms including the VR, the AR, social media, gaming and cryptocurrencies. It involves creation of a vast network of interconnected virtual worlds, allowing users to interact with each other in a seamless, immersive environment. The metaverse is more than just a collection of online communities or social networks. It imagines a future where virtual and physical realities merge, making way for new possibilities in entertainment, education, commerce, and even politics. As the metaverse grows, it will create online spaces where user interactions are more multidimensional than current technology supports. Instead of just viewing digital content, the users in the metaverse will be able to immerse themselves in a space where the digital and physical worlds converge.

Traditionally, information associated with services, and objects such as advertisements are shared with audience by displaying hoardings, or banners associated with the services, and the objects at prominent locations such as office spaces, malls, airports and the like. Such hoarding and banners occupy physical space and are generally expensive to implement because of a cost associated with renting physical spaces for displaying hoardings, and banners. With the rise in the internet and digital world, information is pushed digitally through information delivery systems.

Currently, information delivery system such as but not limited to an advertising systems, information (or advertisements) is generally "pushed" to a user's device based on certain metrics such as, but not limited to, user profile, user location, current trends, user relationships, or other deciding factors. This results in effective engagement of the audience with the advertisements. However, this can be intrusive to user experience and may potentially utilize sensitive or personal user's information. Moreover, such advertising systems utilize manipulation of end-users by intrusively pushing information to the user's devices in order to force them to a location or a transaction that they may have not otherwise intending on pursuing.

As such, there is a need for a system and a mobile application that reverses prior systems utilization of geo-fencing, and instead empower the users to choose what information (including advertisements) is sent and/or received. There is a need for system and/or mobile application that enables the user to decide with their own freewill, the best course of action in viewing their desired, trusted, and true display of relevant information. Moreover, there is a need of the system and mobile application where information is can be published easily, quickly, in a cost effective manner, and without the use of physical spaces.

There is also a need for a system that resolve confusing and congested push-information systems that currently use geo-fencing and other methods of spying on the users. Also, there is a need for system that can enable the users to have option of meeting in-person to buy or sell items with individuals or at set locations and which display information and directions at a distance for desired next steps.

BRIEF SUMMARY

A system, a method, and a computer program product are provided herein that focuses on providing information in extended reality (XR) environment.

In one aspect, a system for providing information in the XR environment is disclosed. The system includes a processor that may be configured to receive a first publisher input via a publisher device. The first publisher input includes at least location information and first information associated with at least one of a service or an object. The processor may be further configured to create a virtual object based on the received first information. The created virtual object is to be rendered in the XR environment corresponding to a physical environment that includes a location specified in the location information. The processor may be further configured to publish the created virtual object at a first virtual location in the XR environment to be viewed via a subscriber device. The first virtual location corresponds to the location specified in the location information.

In additional system embodiments, the object may be one of a stationary object or a movable object, and a position of the movable object changes with respect to time in the physical environment.

In additional system embodiments, the processor may be configured to receive positional information of the movable object from a device associated with the movable object. The processor may be further configured to update the first virtual location of the published virtual object in the XR environment based on the received positional information.

In additional system embodiments, the device associated with the movable object is a radio frequency identification (RFID) device.

In additional system embodiments, the processor may be configured to provide a user interface (UI) via the XR application, to render the XR environment on the publisher device. The processor may be further configured to publish the created virtual object at the first virtual location in the XR environment, based on reception of a first input via an on-air UI element of the UI. The processor may be further configured to unpublish the published virtual object from the first virtual location in the XR environment, based on reception of a second input via an off-air UI element of the UI.

In additional system embodiments, the provided UI further comprises a text box UI element to receive the first information as a textual input.

In additional system embodiments, the provided UI further includes a private messaging UI element and the processor may be configured to render a private information window on the UI based on selection of the private messaging UI element. The processor may be further configured to receive a second publisher input to select at least one of one or more subscribers of a plurality of subscribers and a first time period, via the rendered private information window. The one or more subscribers are authorized to view the created virtual object. The processor may be further configured to publish the created virtual object at the first virtual location for the selected one or more subscribers for the first time period.

In additional system embodiments, the provided UI further includes a public messaging UI element and the processor may be configured to render a public information window on the UI based on selection of the public messaging UI element. The processor may be further configured to receive the second publisher input to select the first time period via the rendered public information window. The processor may be further configured to publish the created virtual object at the first virtual location for the plurality of subscribers for the first time period.

In additional system embodiments, the the service may correspond to one of: a real estate service, an automobile service, a rental service, a dating service, a dining service, a shopping service, a travelling service, a marketing service, a recreation service, a cryptographic asset service, a reviewing service, a government service, a personal service, and an agricultural service.

In additional system embodiments, the processor may be configured to receive, via a subscriber device associated with a subscriber, a first subscriber input associated with a selection of the published virtual object. The processor may be further configured to display information associated with the subscriber device on the publisher device associated with a publisher, based on the reception of the first subscriber input.

In additional system embodiments, the processor may be configured to transmit a payment notification to the subscriber device based on the reception of the first subscriber input. The payment notification includes a first amount to be paid for at least one of the service or the object associated with the created virtual object. The processor may be further configured to receive a payment confirmation notification from the subscriber device. The payment confirmation notification indicates a successful payment of the first amount is completed using one of a cryptocurrency or a fiat currency.

In additional system embodiments, the processor may be configured to receive, via a subscriber device associated with a subscriber, a second subscriber input associated with a selection of one of the service or the object. The processor may be further configured to transmit, to the publisher device, a first notification associated with the selection of one of: the service or the product based on the reception of the second subscriber input. The processor may be further configured to create the first virtual object associated with the one of selected service or the selected product based on the transmitted notification.

In one aspect, a method for providing information in extended reality environment is disclosed. The method includes rendering an extended reality (XR) application on a subscriber device. The method further includes controlling an image sensor to scan a physical environment around the subscriber device using the XR application. The physical environment includes a set of real-world objects. The method further includes retrieving a set of virtual objects associated with at least one of: one or more services or one or more objects of the set of real-world objects. The method further includes displaying, on the subscriber device, the retrieved set of virtual objects at a first set of virtual locations in an XR environment.

In additional method embodiments, the method includes receiving, via the subscriber device associated with a subscriber, a first subscriber input to view the set of virtual objects associated with one of one or more services or one or more objects of the set of real-world objects. The method further includes rendering the XR application based on the first subscriber input.

In additional method embodiments, the method includes receiving, via the subscriber device, a second subscriber input to display one or more virtual objects of the set of virtual objects. The method further includes retrieving the one or more virtual objects based on the reception of the second subscriber input. The method further includes displaying, via the subscriber device, the retrieved one or more virtual objects in the XR environment.

In additional method embodiments, the method includes receiving profile information from the subscriber device via a user interface rendered in the XR application. The method further includes generating a subscriber profile associated with the subscriber device to register on the XR application, based on the received profile information.

In one aspect, a non-transitory computer-readable medium for executing instructions associated with providing information in extended reality environment is disclosed. The instructions include rendering an extended reality (XR) application on a subscriber device. The instructions further include controlling an image sensor to scan a physical environment around the subscriber device using the XR application. The physical environment includes a set of real-world objects. The instructions further include retrieving a set of virtual objects associated with at least one of: one or more services or one or more objects of the set of real-world objects. The instructions further include displaying, on the subscriber device, the retrieved set of virtual objects at a first set of virtual locations in an XR environment.

In additional non-transitory computer-readable medium embodiments, the instructions include receiving, via the subscriber device associated with a subscriber, a first subscriber input to view the set of virtual objects associated with one of: the services or the object. The instructions further include rendering the XR application based on the first subscriber input.

In additional non-transitory computer-readable medium embodiments, the instructions include receiving, via the subscriber device, a second subscriber input to display one or more virtual objects of the set of virtual objects. The instructions further include retrieving the one or more virtual objects based on the reception of the second subscriber input. The instructions further include displaying, via the subscriber device, the retrieved one or more virtual objects in the XR environment.

In additional non-transitory computer-readable medium embodiments, the instructions include receiving profile information from the subscriber device via a user interface rendered in the XR application. The instructions further include generating a subscriber profile associated with the subscriber device to register on the XR application, based on the received profile information.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Figure 1:
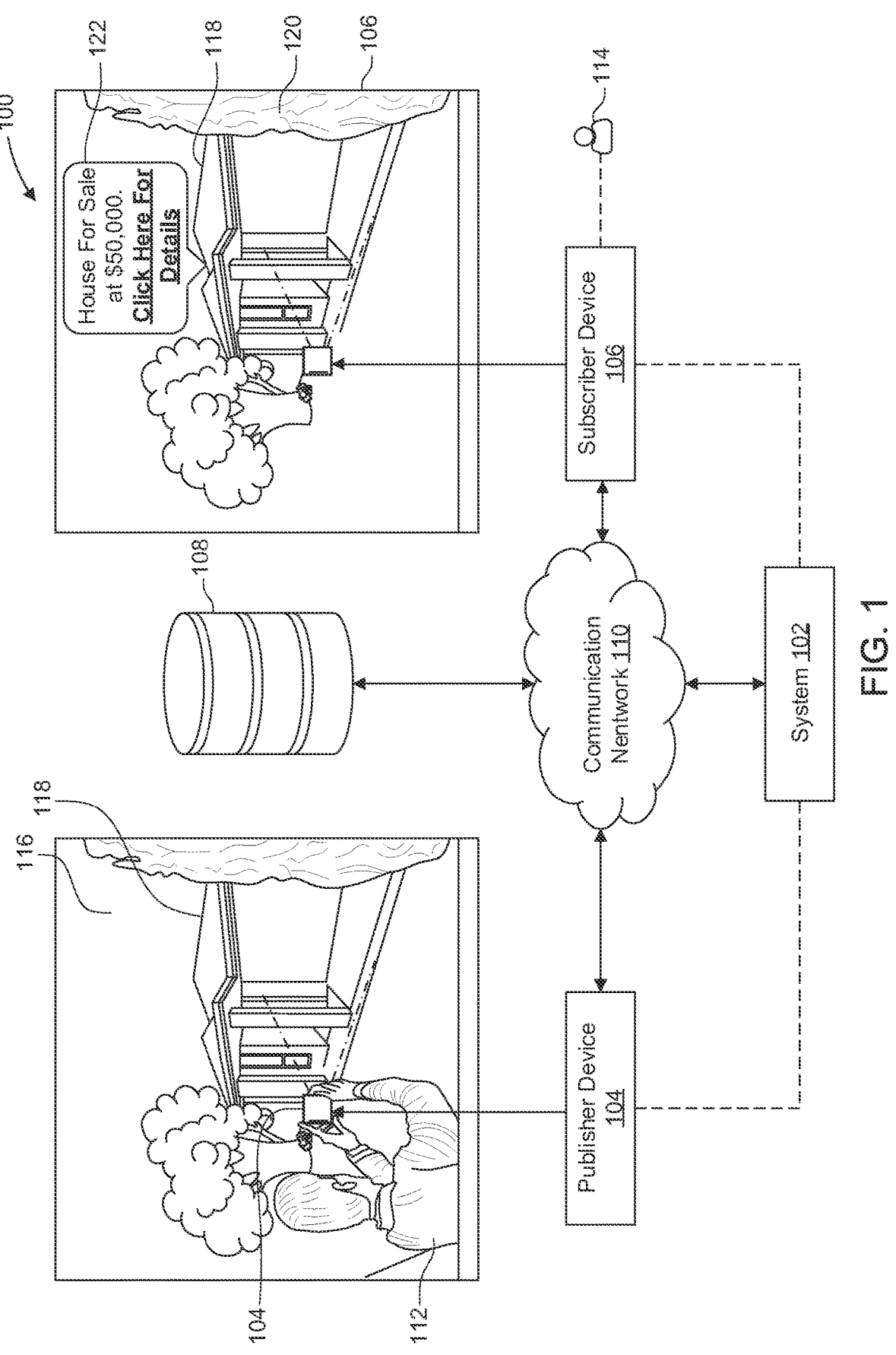
Figure 2:
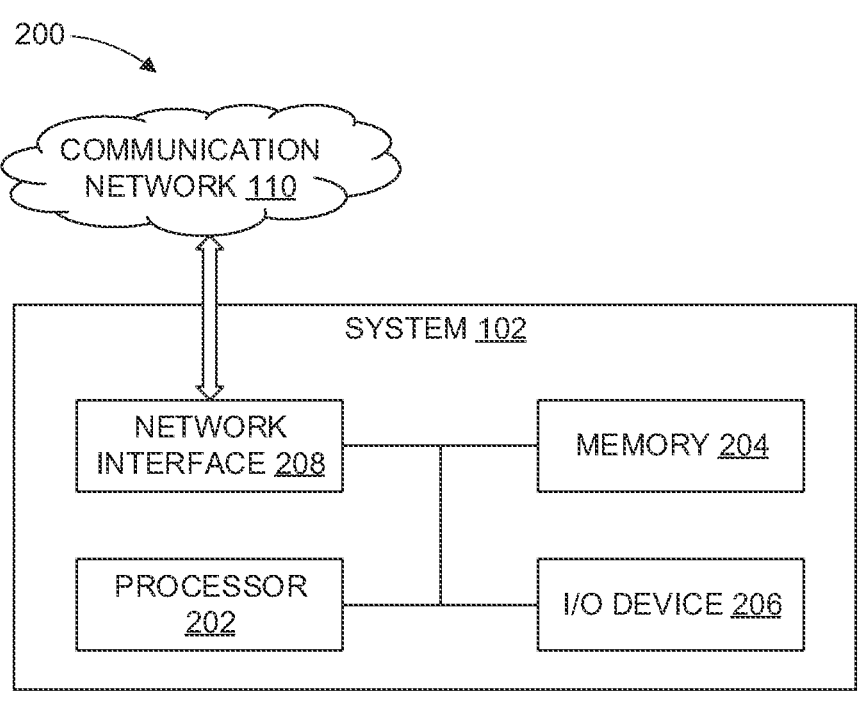
Figure 3A:
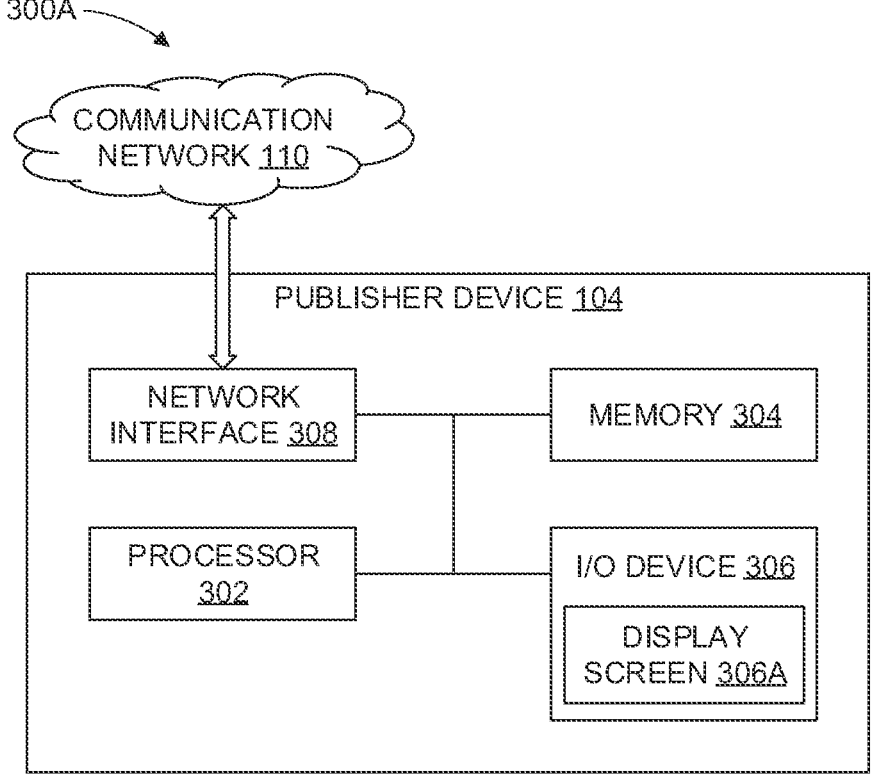
Figure 3B:
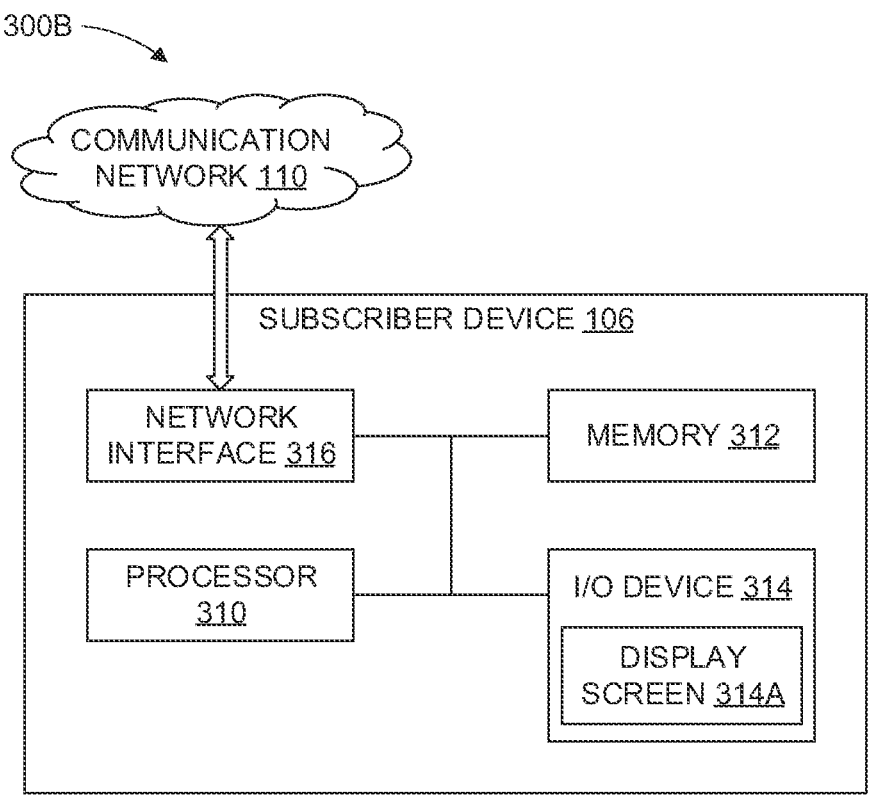
Figure 4:
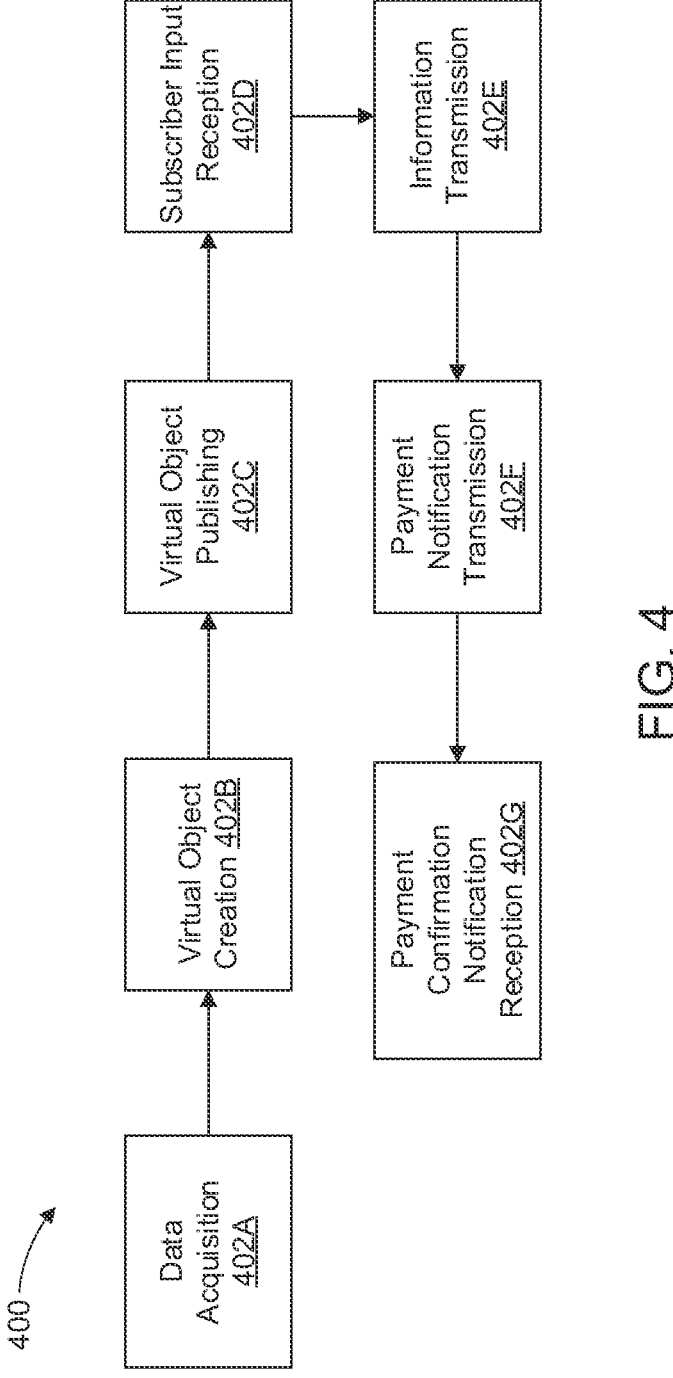
Figure 5:
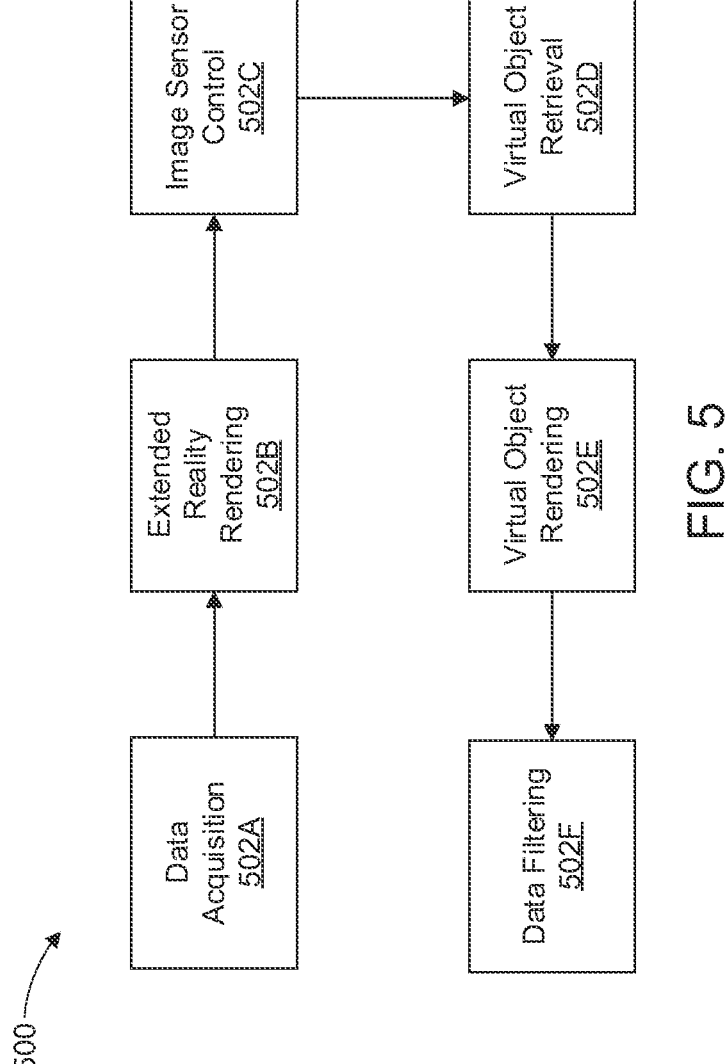
Figure 6:
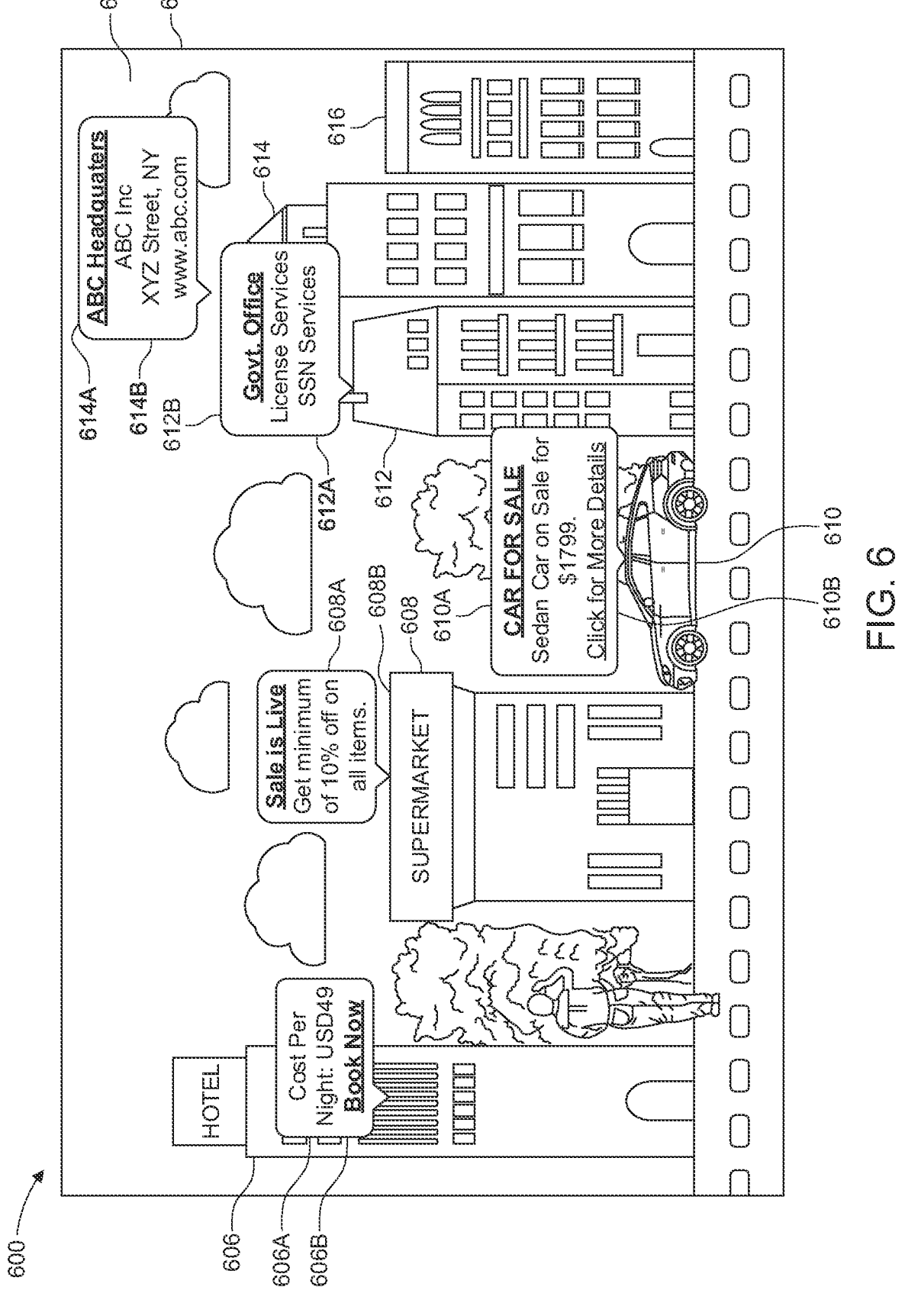

Having thus described example embodiments of the disclosure in general terms, reference will now be made to the accompanying drawings, which are not necessarily drawn to scale, and wherein:

FIG. 1 illustrates an environment comprising a system for providing information in extended reality (XR) environment, in accordance with an example embodiment;

FIG. 2 illustrates an exemplary block diagram of the system, in accordance with one or more example embodiments;

FIG. 3A illustrates an exemplary block diagram of a publisher device, in accordance with one or more example embodiments;

FIG. 3B illustrates an exemplary block diagram of a subscriber device, in accordance with one or more example embodiments;

FIG. 4 is a diagram that illustrates exemplary first set of operations associated with the publisher device for providing information in the XR environment, in accordance with an embodiment of the disclosure;

FIG. 5 is a diagram that illustrates exemplary second set of operations associated with the subscriber device for providing information in the XR environment, in accordance with an embodiment of the disclosure;

FIG. 6 is a diagram that illustrates an exemplary scenario for providing information in the XR environment, in accordance with an embodiment of the disclosure;

FIG. 7 is a flowchart that illustrates an exemplary method for rendering information in the XR environment for at least one publisher, in accordance with an embodiment of the disclosure; and FIG. 8 is a flowchart that illustrates an exemplary method for providing information in the XR environment for at least one subscriber, in accordance with an embodiment of the disclosure.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, systems and methods are shown in block diagram form only in order to avoid obscuring the present disclosure.

Some embodiments of the present disclosure will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. Also, reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced item. Moreover, various features are described which may be exhibited by some embodiments and not by others. Similarly, various requirements are described which may be requirements for some embodiments but not for other embodiments. As used herein, the terms "data," "content," "information," and similar terms may be used interchangeably to refer to data capable of being displayed, transmitted, received and/or stored in accordance with embodiments of the present disclosure. Thus, use of any such terms should not be taken to limit the spirit and scope of embodiments of the present disclosure.

As defined herein, a "computer-readable storage medium," which refers to a non-transitory physical storage medium (for example, volatile or non-volatile memory device), may be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Open air and sky are God-given spaces that are not utilized for physical marketing banners that are permanent in a physical space. The air and sky are open spaces, free and still available in abundance. The disclosed invention is related to protecting such open spaces by creating an unobtrusive information delivery system for a better and safer way of communicating important information to the user. By doing so, the relationship engagement between the provider and user may be improved without obstructing a view or having anything that will have a permanent impact in cluttering the open air or the sky. Users such as publishers can offer various products and services in exchange for money, other items, and/or cryptocurrency should the user desire to sell, purchase or trade on a safe platform to complete the transaction.

The disclosed invention may also enable government, industrial, commercial, and individual user's on-spot live dissemination of unobtrusive information that may be transmitted via the user's location, a mobile phone, and/or a tablet device. This disseminated information may be publicly viewable to all users or may only be viewable by other users that have been given permission to view the information.

In some embodiments, for personal use, the information may be displayed in the open air approximately 4 to 6 feet above the devices. Moreover, for government, industrial, and commercial purposes, the information may be presented at much higher elevations (potentially hundreds of feet) in the sky to offer better visibility. The broadcasting and viewing of information is available to users via the XR application installed on user devices and transmitted through the system.

The users (publishers or subscribers) may be able to broadcast and receive designated information (as virtual objects) being displayed in the open air or sky by holding their corresponding device towards a direction of interest or by simply moving the device around to find the location or information of interest. Specifically, the publishers may be able to broadcast designated information and the subscribers may be able to receive the designated information broadcasted by the publishers. The designated information may not limited to stores or marketing banners, and in fact users may be able to send and receive information with each subscriber of the plurality of subscribers of the XR application once permission has been granted by the publisher and/or system.

The information (or the virtual object) may be sent privately and specific to a particular subscriber or a one or more subscribers of the plurality of subscribers based on a preference of the publisher of the information. Alternatively, the information may made available for each subscriber of the plurality of subscribers of the XR application. The transmitted information may include specific details that may be provided by the publisher. It is envisioned that for personal use, the publisher may include an image whereas, for commercial or search and rescue purposes, a larger space may be justified.

The present disclosure describes numerous possible uses, one of which could be for routing a user when there is insufficient signage. For example, while the user (subscriber or publisher) is driving through deserts or urban areas where there are no proper signs, the XR application may display to the user the small towns, upcoming exits, and other directions that may be available. In regard to governmental search and rescue operations, and/or commercial use, users will have the option to update the description that is displayed in the sky above the subject location.

In accordance with one embodiment of the present disclosure, there is contemplated a system and a mobile application (also referred as an XR application) that allows users to hold their devices containing the XR application up towards the sky to view information about a location, including shop names and locations, special deals, and/or to retrace the user's steps back to a best last known deal to compare prices. For example, a real estate company could identify all of their listing and as a user drives by the subject locations, they would hold their device up towards the sky and see the rental, for sale, open house, or recently sold homes information. Other examples would include cruise ships, and all key locations could be displayed in the open sky to provide a location directory for ship guests. Furthermore, restaurant chains and shopping malls would similarly use the system to display menu and offers.

The sky is a God-given space, is free and still available to use in abundance. One intention of the present disclosure is to unobtrusively deliver information in an improved and safer way, by communicating important information to the user, thus improving the relationship engagement between the provider and the subscriber. The systems and XR application described herein are intended to resolve advertisement congestion and manipulation of end-users by the prior art method of pushing ads to their devices. Instead, the systems disclosed herein will reverse the geo-fencing effect and empower the users to decide the best course of action by displaying the information they are seeking by displaying relevant information in the sky above locations at all times.

The present disclosure is unobtrusive, cheaper, and safer for users and gives providers the control to reach each group that desires the information, rather than hunting customers to deliver push advertisements. In particular, subject information is displayed in the sky above the location, and users will be able to hold their devices toward the sky and identify the name, location, and distance guidance (for example) to their desired location.

A system for providing information in extended reality (XR) environment is provided herein in accordance with an example embodiment for providing information in the XR environment.

FIG. 1 illustrates an environment 100 comprising a system 102 for providing information in extended reality environment, in accordance with an example embodiment. As illustrated in FIG. 1, the environment 100 may comprise the system 102, a publisher device 104, a subscriber device 106, a database 108, and a communication network 110. With reference to FIG. 1, there is further shown a publisher 112, a subscriber 114, a physical environment 116, an object 118, an XR environment 120, and a virtual object 122. Additional, fewer, or different components may be provided. For example, a proxy server, a name server, a map server, a cache server or cache network, a router, a switch or intelligent switch, additional computers or workstations, administrative components, such as an administrative workstation, a gateway device, a backbone, ports, network connections, and network interfaces may be provided. While the components in FIG. 1 are shown as separate from one another, one or more of these components may be combined. In this regard, the system 102 may be communicatively coupled to the components shown in FIG. 1 to carry out the desired operations and wherever required modifications may be possible within the scope of the present disclosure.

The system 102 may include suitable logic, circuitry, interfaces, and/or code that may be configured to create the virtual object 122 associated with a service or the object 118 and render the created virtual object 122 in the XR environment 120. The system 102 may be configured to receive a first publisher input from the publisher device 104. The system 102 may be configured to create the virtual object 122 based on the received first information. The created virtual object 122 is to be rendered in the XR environment 120 corresponding to the physical environment 116 that may include a location specified in the location information. The location information may be included in the first information. The system 102 may be further configured to publish the created virtual object 122 at a first virtual location in the XR environment 120 to be viewed by the subscriber 114. The first virtual location may correspond to the location specified in the location information.

The publisher device 104 may include suitable logic, circuitry, interfaces, and/or code that may be configured to receive the first publisher input and/or a second publisher input from the publisher 112 and further transmit the received first publisher input and/or the second publisher input to the system 102. In an embodiments, the publisher device 104 may be configured to provide a user interface that may be utilized by the publisher 112 to provide the first publisher input and/or the second publisher input. In an embodiment, the publisher device 104 may be configured to receive a first set of notifications from the system 102 and render the first set of notifications on a display screen associated with the publisher device 104. The first set of notifications may include, but are not limited to, a payment confirmation notification and a first notification associated with the reception of a second subscriber input. The publisher device 104 may be associated with the publisher 112 who may be a user of the XR application. The publisher 112 may be using the XR application to provide one or more services and/or one or more products to the subscriber 114 on the XR application. In an embodiment, the publisher 112 may be an individual who wishes to render information in the XR application for personal usage. For example, the publisher 112 may be utilizing the XR application to link the information with subjects, such as other users, e.g., their children. In such cases, the publisher 112 and the subscriber 114 may be same. Examples of the publisher device 104 may include, but are not limited to, a smartphone, a cellular phone, a mobile phone, a gaming device, a consumer electronic (CE) device, a computing device, a computer work-station, a mainframe machine, and/or a server.

The subscriber device 106 may include suitable logic, circuitry, interfaces, and/or code that may be configured to receive the first subscriber input and/or a second subscriber input from the subscriber 114 and further transmit the received first subscriber input and/or the second subscriber input to the system 102. In an embodiment, the subscriber device 106 may be configured to provide a user interface that may be utilized by the subscriber 114 to provide the first subscriber input and/or the second subscriber input. In an embodiment, the subscriber device 106 may be configured to receive a second set of notifications from the system 102 and render the received second set of notifications on a display screen associated with the subscriber device 106. The second set of notifications may include, but are not limited to, a payment notification. The subscriber device 106 may be associated with the publisher 114 who may be a user of the XR application. The publisher 112 may be using the XR application to use the one or more services and/or one or more products provided by the publisher 112 on the XR application. Examples of the subscriber device 106 may include, but are not limited to, the smartphone, the cellular phone, the mobile phone, the gaming device, the consumer electronic (CE) device, the computing device, the computer work-station, the mainframe machine, and/or the server.

The database 108 may include suitable logic, circuitry, code, and/or interfaces that may be configured to store location information, first information, and information associated with a plurality of publishers, a plurality of subscribers, and a first time period. The database 108 may be further configured to store a set of virtual objects associated with at least one of the object or the service. In another embodiment, the database 108 may store program instructions to be executed by the system 102. In an embodiment, the database 108 may include a distributed ledger can be spread across multiple nodes or computers, rather than being stored in a single location. The data on the ledger may replicated and synchronized across all nodes, ensuring that all parties have access to the same information. This may be advantageous in transactions related to cryptographic assets such as crypto currency and non-fungible tokens (NFTs). Example implementations of the database 108 may include, but are not limited to a centralized database, a distributed database, a no structured query language (NoSQL) database, a cloud database, a relational database, a network database, an object-oriented database and a hierarchical database.

The communication network 110 may include a communication medium through which the system 102, the publisher device 104, the subscriber device 106, and the database 108 may communicate with each other. The communication network 110 may be one of a wired connection or a wireless connection. Examples of the communication network 110 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the environment 100 may be configured to connect to the communication network 110 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the system 102 may be configured to receive the first publisher input from the publisher device 104. As discussed above, the publisher device 104 may be associated with the publisher 112. The received first publisher input may include, but is not limited to, location information, and first information. The location information, and the first information may be associated with at least one of a service or an object.

The system 102 may be further configured to create the virtual object 122 based on the first information. The created virtual object 122 may be associated with at least one of the service or the object 118. The created virtual object 122 may refer to a digital, three-dimensional object that may be created through a computer-generated imagery (CGI). In an embodiment, the virtual object 122 may be a representation of a physical object, such as a car or a building, or a completely fictional entity, such as a cartoon character or a board (as displayed in FIG. 1). The created virtual object 122 may be rendered in the XR environment 120. The XR environment 120 may correspond to the physical environment 116 that may include a location. The location may be a physical location that may be specified in the location information included in the received first publisher input. The location information may be for example, specified by the publisher 112 by providing a touch input on the user interface of the XR application.

The XR environment 120 may be a virtual experience that may blur boundaries between a physical world and a digital world. The XR environment 120 may be a fully immersive three-dimensional experience. In an embodiment, the system 102 may be configured to generate the XR environment 120 based on scanning of one or more real world objects that may be present in the physical environment 116. The scanning may be done using at least one image sensor that may be associated with the subscriber device 106 and/or the publisher device 104.

The system 102 may be further configured to publish the created virtual object 122 at a first virtual location in the XR environment 120. The virtual object 122 may be published to be viewed by the subscriber 114. The first virtual location may correspond to the location that may be specified in the location information. Details about the virtual object 122 are provided, for example, in FIG. 4, FIG. 5, and FIG. 6.

FIG. 2 illustrates an exemplary block diagram of the system 102, in accordance with one or more example embodiments. FIG. 2 is explained in conjunction with FIG. 1. With reference to FIG. 2, there is shown a block diagram 200 of the system 102. The system 102 may include at least one processor 202, a memory 204, an input/output (I/O) interface 206, and a network interface 208. The processor 202 may be communicatively coupled to the memory 204, the I/O device 206, and the network interface 208.

The processor 202 may comprise suitable logic, circuitry, and interfaces that may be configured to execute instructions stored in the memory 204. The executed instructions may correspond to receiving the first publisher input, creating the virtual object 122, and publishing the created virtual object 122 in the XR environment 120. In another embodiment, the executed instructions may correspond to rendering the XR application, controlling an image sensor, retrieving a set of virtual objects, and displaying the retrieved set of virtual objects. The processor 202 may be implemented based on a number of processor technologies known in the art. Examples of the processor 202 may include, but are not limited to, a Graphical Processing Unit (GPU), a co-processor, a Central Processing Unit (CPU), x86-based processor, a Reduced Instruction Set Computing (RISC) processor, an Application-Specific Integrated Circuit (ASIC) processor, a Complex Instruction Set Computing (CISC) processor, and a combination thereof.

The memory 204 may include suitable logic, circuitry, and/or interfaces that may be configured to store the program instructions executable by the processor 202. Additionally, the memory 204 may store the received one or more publisher inputs including the first publisher input and the second publisher input, a payment notification, and a payment confirmation notification. In another embodiment, the memory 204 may further store the created set of virtual objects. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O interface 206 may comprise suitable logic, circuitry, and/or devices that may be configured to act as an I/O channel between the publisher device 104, the subscriber device 106, and the system 102. In some embodiments, the system 102 may receive publisher and/or subscriber input such as the first publisher input, the second publisher input, the first subscriber input, and the second subscriber input via the I/O interface 206. The I/O interface 206 may comprise various input and output devices, which may be configured to communicate with different operational components of the system 102. Examples of the I/O interface 206 may include, but are not limited to, a touch screen, a keyboard, a mouse, a joystick, a microphone, and a display screen.

The network interface 208 may comprise suitable logic, circuitry, interfaces, and/or code that may be configured to establish communication between the system 102, the publisher device 104, the subscriber device 106, and the database 108, via the communication network 110. The network interface 208 may be configured to implement known technologies to support wired or wireless communication. The network interface 208 may include, but is not limited to, an antenna (such as the antenna 210), a radio frequency (RF) transceiver, one or more amplifiers, a tuner, one or more oscillators, a digital signal processor, a coder-decoder (CO-DEC) chipset, a subscriber identity module (SIM) card, and/or a local buffer.

The network interface 208 may be configured to communicate via offline and online wireless communication with networks, such as the Internet, an Intranet, and/or a wireless network, such as a cellular telephone network, a wireless local area network (WLAN), personal area network, and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), Long-Term Evolution (LTE), time division multiple access (TDMA), Bluetooth, Wireless Fidelity (Wi-Fi) (such as IEEE 802.11, IEEE 802.11b, IEEE 802.11g, IEEE 802.11n, and/or any other IEEE 802.11 protocol), voice over Internet Protocol (VoIP), Wi-MAX, Internet-of-Things (IoT) technology, Machine-Type-Communication (MTC) technology, a protocol for email, instant messaging, and/or Short Message Service (SMS).

FIG. 3A illustrates an exemplary block diagram of the publisher device 104, in accordance with one or more example embodiments. FIG. 3A is explained in conjunction with FIG. 1, and FIG. 2. With reference to FIG. 3A, there is shown a block diagram 300A of the publisher device 104. The publisher device 104 may include at least one processor 302, a memory 304, an input/output (I/O) interface 306, and a network interface 308. The processor 302 may be communicatively coupled to the memory 304, the I/O device 306, and the network interface 308. In accordance with an embodiment, the publisher device 104 may further include a display screen 306A.

The processor 302 may comprise suitable logic, circuitry, and interfaces that may be configured to execute instructions stored in the memory 304. The executed instructions may correspond to transmitting the first publisher input, and displaying the virtual object 122. The processor 302 may be implemented based on a number of processor technologies known in the art. Examples of the processor 302 may include, but are not limited to, the Graphical Processing Unit (GPU), the co-processor, the Central Processing Unit (CPU), x86-based processor, the Reduced Instruction Set Computing (RISC) processor, the Application-Specific Integrated Circuit (ASIC) processor, the Complex Instruction Set Computing (CISC) processor, and the combination thereof.

The memory 304 may include suitable logic, circuitry, and/or interfaces that may be configured to store the program instructions executable by the processor 302. Additionally, the memory 304 may store the one or more publisher inputs including the first publisher input and the second publisher input. In another embodiment, the memory 304 may further store the created virtual object 122. Examples of implementation of the memory 304 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O interface 306 may comprise suitable logic, circuitry, and/or devices that may be configured to act as an I/O channel between the system 102, the subscriber device 106, and the publisher device 104. In some embodiments, the publisher device 104 may transmit the one or more publisher inputs such as the first publisher input and the second publisher input, via the I/O interface 306. The I/O interface 306 may comprise various input and output devices, which may be configured to communicate with different operational components of the publisher device 104. Examples of the I/O interface 306 may include, but are not limited to, a touch screen, a keyboard, a mouse, a joystick, a microphone, and a display screen (such as the display screen 306A).

The display screen 306A may comprise suitable logic, circuitry, and interfaces that may be configured to display information associated with the system 102 and/or the publisher device 104. In an embodiment, the display screen 306A may further display a user interface to receive the one or more publisher inputs. In some embodiments, the display screen 306A may be an external display device that may be associated with the publisher device 104. The display screen 306A may be a touch screen which may enable the publisher 112 to provide the publisher input (such as the first publisher input and the second publisher input) via the display screen 306A. The touch screen may be at least one of a resistive touch screen, a capacitive touch screen, or a thermal touch screen. The display screen 306A may be realized through several known technologies such as, but are not limited to, at least one of a Liquid Crystal Display (LCD) display, a Light Emitting Diode (LED) display, a plasma display, or an Organic LED (OLED) display technology, or other display devices. In accordance with an embodiment, the display screen 306A may refer to a display screen of a head mounted device (HMD), a smart-glass device, a see-through display, a projection-based display, an electro-chromic display, or a transparent display.

The network interface 308 may comprise suitable logic, circuitry, interfaces, and/or code that may be configured to establish communication between the publisher device 104, the system 102, the subscriber device 106, and the database 108, via the communication network 110. The network interface 308 may be configured to implement known technologies to support wired or wireless communication. The network interface 308 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 308 may be configured to communicate via offline and online wireless communication with networks, such as the Internet, an Intranet, and/or a wireless network, such as a cellular telephone network, a wireless local area network (WLAN), personal area network, and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), Long-Term Evolution (LTE), time division multiple access (TDMA), Bluetooth, Wireless Fidelity (Wi-Fi) (such as IEEE 802.11, IEEE 802.11b, IEEE 802.11g, IEEE 802.11n, and/or any other IEEE 802.11 protocol), voice over Internet Protocol (VoIP), Wi-MAX, Internet-of-Things (IoT) technology, Machine-Type-Communication (MTC) technology, a protocol for email, instant messaging, and/or Short Message Service (SMS).

FIG. 3B illustrates an exemplary block diagram of the subscriber device 106, in accordance with one or more example embodiments. FIG. 3B is explained in conjunction with FIG. 1, FIG. 2, and FIG. 3A. With reference to FIG. 3B, there is shown a block diagram 300B of the subscriber device 106. The subscriber device 106 may include at least one processor 310, a memory 312, an input/output (I/O)

interface 314, and a network interface 316. The processor 310 may be communicatively coupled to the memory 312, the I/O device 314, and the network interface 316. In accordance with an embodiment, the subscriber device 106 may further include a display screen 314A.

The processor 310 may comprise suitable logic, circuitry, and interfaces that may be configured to execute instructions stored in the memory 312. The executed instructions may correspond to transmitting the first subscriber input, and rendering the set of virtual objects including the virtual object 122 in the XR environment 120. The processor 310 may be implemented based on a number of processor technologies known in the art. Examples of the processor 310 may include, but are not limited to, the GPU, the co-processor, the CPU, the x86-based processor, the RISC processor, the ASIC processor, the CISC processor, and a combination thereof.

The memory 312 may include suitable logic, circuitry, and/or interfaces that may be configured to store the program instructions executable by the processor 310. Additionally, the memory 312 may store the one or more subscriber inputs including the first subscriber input and the second subscriber input. Examples of implementation of the memory 312 may include, but are not limited to, the RAM, the ROM, the EEPROM, the HDD, the SSD, the CPU cache, and/or the SD card.

The I/O interface 314 may comprise suitable logic, circuitry, and/or devices that may be configured to act as an I/O channel between the subscriber device 106, the system 102, and the publisher device 104. In some embodiments, the subscriber device 106 may transmit the one or more subscriber inputs such as the first subscriber input and the second subscriber input, via the I/O interface 314. The I/O interface 314 may comprise various input and output devices, which may be configured to communicate with different operational components of the subscriber device 106. Examples of the I/O interface 314 may include, but are not limited to, the touch screen, the keyboard, the mouse, the joystick, the microphone, and the display screen (such as the display screen 314A).

The display screen 314A may comprise suitable logic, circuitry, and interfaces that may be configured to display information associated with the system 102 and/or the subscriber device 106. In an embodiment, the display screen 314A may further display a user interface to receive the one or more subscriber inputs. In some embodiments, the display screen 314A may be an external display device that may be associated with the subscriber device 106. The display screen 314A may be a touch screen which may enable the subscriber 114 to provide the one or more subscriber inputs (such as the first subscriber input and the second subscriber input) via the display screen 314A. The touch screen may be at least one of a resistive touch screen, a capacitive touch screen, or a thermal touch screen. The display screen 314A may be realized through several known technologies such as, but are not limited to, at least one of the LCD display, the LED display, the plasma display, or the OLED display technology, or other display devices. In accordance with an embodiment, the display screen 314A may refer to the display screen of the HMD, the smart-glass device, the see-through display, the projection-based display, the electro-chromic display, or the transparent display.

The network interface 316 may comprise suitable logic, circuitry, interfaces, and/or code that may be configured to establish communication between the subscriber device 106, the system 102, the publisher device 104, and the database 108, via the communication network 110. The network interface 316 may be configured to implement known technologies to support wired or wireless communication. The network interface 316 may include, but is not limited to, the antenna, the RF transceiver, the one or more amplifiers, the tuner, the one or more oscillators, the digital signal processor, a coder-decoder (CODEC) chipset, a subscriber identity module (SIM) card, and/or a local buffer.

The network interface 316 may be configured to communicate via offline and online wireless communication with networks, such as the Internet, an Intranet, and/or a wireless network, such as a cellular telephone network, the WLAN, the PAN, personal area network, and/or the MAN. The wireless communication may use any of a plurality of communication standards, protocols and technologies, such as the GSM, the EDGE, the W-CDMA, the CDMA, the LTE, the TDMA, the Bluetooth, the Wi-Fi) (such as IEEE 802.11, IEEE 802.11b, IEEE 802.11g, IEEE 802.11n, and/or any other IEEE 802.11 protocol), the VoIP, the Wi-MAX, the IoT technology, Machine-Type-Communication (MTC) technology, a protocol for email, instant messaging, and/or Short Message Service (SMS).

FIG. 4 is a diagram that illustrates exemplary first set of operations associated with the publisher device 104 for providing information in the XR environment 120, in accordance with an embodiment of the disclosure. FIG. 4 is explained in conjunction with elements from FIG. 1, FIG. 2, FIG. 3A, and FIG. 3B. With reference to FIG. 4, there is shown a block diagram 400 that illustrates exemplary operations from 402A to 402G, as described herein. The exemplary operations illustrated in the block diagram 400 may start at 402A and may be performed by any computing system, apparatus, or device, such as by the system 102 of FIG. 1 or the processor 202 of FIG. 2. Although illustrated with discrete blocks, the exemplary operations associated with one or more blocks of the block diagram 400 may be divided into additional blocks, combined into fewer blocks, or eliminated, depending on the particular implementation.

The disclosed system may operate in two phases—a setup phase, and an operational phase. In the setup phase, the publisher 112 may download a software application (hereinafter referred as "XR Application") on the publisher device 104 associated with the publisher 112. The XR application may be one of a mobile application, a web application, a desktop application, or a cloud application. For the sake of simplicity, the XR application may be considered as the mobile application that may be installed on the publisher device 104. The publisher 112 may be further required to activate the XR application by registering an account on the XR application. The publisher 112 may be further required to adjust one or more settings within the XR application and complete a publisher profile that may be associated with the publisher 112. The publisher 112 may further required to select a type of user for using the XR application from a set of user types on the publisher device 104. The set of user types may include, but are not limited to, a publisher, a subscriber, or both publisher and subscriber. In an embodiment, the publisher 112 may select the user type as the "publisher". After the selection of the user type, the setup phase may be completed and the system 102 may operate in the operational phase. In the operational phase, the exemplary operations from 402A to 402G may be executed.

At 402A, a data acquisition operation may be executed. In the data acquisition operation, the system 102 may be configured to receive a first publisher input. The first publisher input may be received from the publisher 112 via the publisher device 104. The first publisher input may include at least location information and first information associated with at least one of a service or an object. The service may correspond to one of a real estate service (selling/renting of houses/buildings and the like), an automobile service (selling/servicing of bikes/cars/airplanes and the like), a rental service (selling/renting of houses/hotels and the like), a dating service (profile matching and virtual meetups) a dining service (services associated with restaurants/cafes and the like), a shopping service (selling of goods/products and the like), a travelling service (trip planning, ticket booking, and the like), a marketing service (advertisements and the like), a recreation service (gaming services and the like), a cryptographic asset service (trading of non-fungible tokens, cryptocurrency trading and the like), a reviewing service (customer feedback management service), a government service (social services), a personal service, and an agricultural service (crop management). Details about one or more application areas in the above mentioned services are provided, for example, in FIG. 6.

In an embodiment, the product may be one of a stationary object or a movable object. The stationary object may have a constant (or a fixed) position with respect to time in a physical environment 116 whereas the position of the movable object changes with respect to time in the physical environment 116. Examples of the stationary object may include, but are not limited to, a building, a tree, a pillar, a piece of land and the like. Examples of the movable object may include, but are not limited to, a person, a car, an airplane, a rocket, a planet, and the like.

In an embodiment, a user interface (UI) may be provided by the XR application. The UI may be rendered on the publisher device 104 and may include a set of UI elements. The set of UI elements may include, for e.g., a text box UI element. In an embodiment, the first publisher input may be received via the text box UI element. Specifically, the first information may be received as a textual input via the text box UI. In an embodiment, the first publisher input further include a word limit restriction for the first information to be added in the textbox UI. By way of example, the word limit may be 20 words.

The location information included in the first information may include location co-ordinates associated with a physical location in the physical environment 116. In an embodiment, the publisher may select a physical location on a map application (such as Google® Maps or Apple® Maps). The system 102 may be further configured to determine the location co-ordinates associated with the selected physical location. In an embodiment, the location may correspond to a point on a building located at the physical location. The system 102 may be configured to generate an identifier of the received point and store the generated identifier in the memory 204. Examples of such scenarios are provided, for example, in FIG. 6.

In an embodiment, the first information may include information associated with at least one of the service or the object 118. The first information may include all the required details that may have to be viewed by a plurality of subscribers of the XR application. As a first example, if the service is a hotel booking service, the required details may include, but are not limited to, a name of the hotel, a star-rating of the hotel, a price for one night booking at the hotel, a location of the hotel, and a user rating of the hotel. In an embodiment, some of the details may be required to create the virtual object 122 associated with the service or the product.

In an embodiment, the system 102 may be configured to render the UI on the publisher device 104. The rendered UI may further include a private messaging UI element. In the private messaging UI, the created virtual object may be rendered only to one or more subscribers of the plurality of subscribers. Based on the selection of the private messaging UI element, the system 102 may be configured to render a private information window on the UI. The system 102 may be further configured to receive a second publisher input from the publisher device 104 via the private information window displayed on the UI. The second publisher input may correspond to a selection of at least one of one or more subscribers of the plurality of subscribers and a first time period. The one or more subscribers may include one or more friends, one or more colleagues, one or more family members, or an individual subscriber associated with the publisher 112. The selected one or more subscribers may be authorized to view the virtual object 122 associated with the selected at least one of the service or the object. Details about the virtual object 112 are provided below.

In another embodiment, the system 102 may be configured to render the UI on the publisher device 104. The rendered UI may further include a public messaging UI element. The publisher 112 may select the public messaging UI element in case the publisher 112 may wish that the created virtual object 122 may be published for each subscriber of the XR application. Based on the selection of the public messaging UI element, the system 102 may be configured to render a public information window on the UI. The system 102 may be further configured to receive the second publisher input from the publisher device 104 via the public information window displayed on the UI. The second publisher input may correspond to a selection of the first time period. The virtual object 122 associated with the selected at least one of the service or the object may be published for the first time period included in the second publisher input. Details about the virtual object are provided below.

At 402B, a virtual object creation operation may be executed. In the virtual object creation operation, the system 102 may be configured to create the virtual object 122. In an embodiment, the virtual object 122 may be created based on the received first information. As discussed above, the virtual object 122 may refer to a digital, three-dimensional object that may be created through a computer-generated imagery (CGI). In an embodiment, the virtual object 122 may be a representation of a physical object, such as a car or a building, or a completely fictional entity, such as a cartoon character or a board (as displayed in FIG. 1). In one or more embodiments, the virtual object 122 may be text.

In an embodiment, the created virtual object 122 may have to be rendered in an extended reality (XR) environment 120. The XR environment 120 may correspond to the physical environment 116 that includes the location specified in the location information. The physical environment 116 may refer to an actual surrounding and conditions in which an individual (such as the publisher 112 or the subscriber 114) operates in the real-world. The physical environment 116 may have tangible real-world objects, such as, but not limited to, buildings, trees, pillars, and structures. The XR environment 120 may refer to a simulated reality in which users (such as the plurality of publishers or the plurality of subscribers) may interact with the created virtual object 122 and environments in a three-dimensional space. The XR environment 120 may use technology to create an immersive experience that allows the individual (such as the publisher 112 or the subscriber 114) to feel like they are interacting with a virtual world. The XR environment 120 may be designed to provide a digital sense of presence, allowing the user to experience real-world actions in a virtual setting.

At 402C, a virtual object publishing operation may be executed. In the virtual object publishing operation, the system 102 may be configured to publish the created virtual object 122 at a first virtual location in the XR environment 120. The created virtual object 122 may be published to be viewed by the plurality of subscribers including the subscriber 114. The first virtual location may correspond to the location that may be specified in the location information included in the received first publisher input.

In an embodiment, the created virtual object 122 may be configured to publish the created virtual object 122 at the first virtual location for the selected one or more subscribers for the first time period. As discussed above, the one or more subscribers and the first time period may be included in the received second publisher input. In another embodiment, the system 102 may be configured to publish the created virtual object 122 at the first virtual location for the plurality of subscribers for the first time period included in the received second publisher input.

In an embodiment, the system 102 may provide the UI via the XR application. The system 102 may be configured to receive a first input via an on-air UI element of the UI. Based on the reception of the first input via the on-air UI element of the UI, the system 102 may be configured to publish the created virtual object 122 at the first virtual location in the XR environment 120. In an embodiment, the system 102 may be further configured to render a first visual indicator (such as a green light) on the publisher device 104 to confirm that the created first virtual object 122 is published on the XR application to be viewed by the plurality of subscribers.

In another embodiment, the system 102 may be configured to receive a second input via an off-air UI element of the UI rendered on the publisher device 104. Based on the reception of the second input via the off-air UI element of the UI, the system 102 may be configured to unpublish the published virtual object 122 from the first virtual location in the XR environment 120. In an embodiment, the system 102 may be further configured to render a second visual indicator (such as a red light) on the publisher device 104 to confirm that the created first virtual object 122 has been unpublished from the XR application and may not be visible to the plurality of subscribers. This may be done to add more information associated with the service or the product.

Based on the selection of the on-air UI element and the off-air UI element, the publisher 112 may be able to publish or unpublish the created virtual object 122 from the plurality of subscribers of the XR application. The publisher 112 may be able to control the publishing of the virtual object 122 based the selection of the on-air UI element and the off-air UI element of the UI provided by the publisher 112. Once the created virtual object 122 is published, all information associated with the created virtual object 122 may be stored in the memory 204. The publisher may not have to enter the information associated with the created virtual object 122 even after the virtual object 122 is unpublished in the past.

At 402D, a subscriber input reception operation may be executed. In the subscriber input reception operation, the system 102 may be configured to receive a first subscriber input from the subscriber device 106 associated with the subscriber 114 of the plurality of subscribers. The received first subscriber input may be associated with a selection of the published virtual object 122. With reference to the first example, if the created virtual object 122 may be associated with hotel booking service, then the created virtual object

122 may include the name of the hotel, the star-rating of the hotel, and the price for one night booking at the hotel. The created virtual object 122 may also include a hyperlink associated with a website to book the hotel. In an embodiment, the created virtual object 122 may be displayed at the top of a building of the hotel in the XR environment 120.

At 402E, an information transmission operation may be executed. In the information transmission operation, the processor 202 may be configured to display information associated with the subscriber device 106 on the publisher device 104 associated with the publisher 112. It may be deemed as the subscriber 114 may be interested in the service or the product associated with the published virtual object 122 based on the reception of the first subscriber input.

In an embodiment, the system 102 may be configured to display contact information of the subscriber 114 associated with the publisher device 104. The publisher 112 may be able to directly co-ordinate with the subscriber 114 to negotiate, and ultimately close the deal. In another embodiment, the system 102 may be configured to display the first information associated with the service or the product on the subscriber device 106. The first information associated with the service or the product may be displayed on the subscriber device 106 based on the reception of the first subscriber input.

At 402F, in some embodiments, a payment notification transmission operation may be executed. In the payment notification transmission operation, the system 102 may be configured to transmit a payment notification to the subscriber device 106 based on the reception of the first subscriber input. The payment notification may include a first amount to be paid for at least one of the service or the object associated with the created virtual object 122. In an embodiment, the first amount may be included in the first information associated with the service or the product. In another embodiment, the first amount may be decided based on a discussion between the publisher 112 and the subscriber 114.

In case, the first amount is decided based on the discussion between the publisher 112 and the subscriber 114, the system 102 may be configured to receive amount information associated with the first amount to be paid for at least one of the service or the object associated with the created virtual object 122 from the publisher device 104. The received amount information may include the first amount. The system 102 may be configured to transmit the payment notification to the subscriber device 106 based on the reception of the amount information. In case, the first amount in included in the first information, the system 102 may be configured to transmit the payment notification to the subscriber device 106 based on the reception of the first subscriber input.

At 402G, a payment confirmation notification reception operation may be performed. In the payment confirmation notification reception operation, the system 102 may be configured to receive a payment confirmation notification from the subscriber device 106. The payment confirmation notification may indicate a successful payment of the first amount. In an embodiment, the payment of the first amount may be completed using a cryptocurrency. The cryptocurrency may refer to a digital or virtual currency that may uses cryptography techniques for security and to regulate the generation of units of currency. The cryptocurrency may be decentralized and may operate on one or more peer-to-peer network. Examples of cryptocurrency may include, but are not limited to, Bitcoin®, Ethereum®, Ripple®, and Litecoin®.

In another embodiment, the payment of the first amount may be completed using a fiat currency. The fiat currency may be a government-issued currency and may be issued by the government. The fiat currency may be regulated and monitored by the government. In an embodiment, the payment of the first amount completed using the fiat currency may be done via a cash transaction, a credit card, a debit card, an internet banking, and the like.

In some embodiments, the system 102 may be further configured to unpublish the published virtual object 122 from the XR environment 120 based on the reception of the payment confirmation notification. For example, if the virtual object 122 is associated with a car to be sold, the system 102 may be configured to unpublish the virtual object 122 associated with the car from the XR environment 120 as the car may be sold to the subscriber 114 associated with the subscriber device 106. In some other embodiment, the system 102 may be further configured to keep the published virtual object 122 on the XR environment 120 even after the reception of the payment confirmation notification. For example, if the virtual object 122 is associated with a hotel stay, the system 102 may keep the virtual object 122 published in the XR environment 120 even if payments from multiple subscribers may be received.

In an embodiment, the system 102 may be configured to receive a second subscriber input. The second subscriber input may be associated with a selection of one of the service or the object. Based on the reception of the second subscriber input, the system 102 may be further configured to transmit a first notification associated with the selection of one of the service or the product to one or more publisher devices associated with one or more publishers of the plurality of publishers. Based on the transmitted notification, each of the one or more publishers may be notified about a potential subscriber (or buyer) of the selected service or object. In an embodiment, the system 102 may be configured to determine a location of the subscriber device 106 and further determine the one or more publisher devices based on the determined location of the subscriber device 106. Each of the one or more publisher devices may offer the selected service or object within a pre-defined distance from the determined location of the subscriber device 106.

The system 102 may be further configured to create one or more virtual objects associated with the one of selected service or the selected product. The one or more virtual objects may be created from a publisher input received from the one or more publisher devices. The publisher input may be received from the one or more publisher devices based on the transmitted notification. The system 102 may be further configured to publish the created virtual object 122 at one or more virtual location in the XR environment 120 to be viewed via the subscriber device 106.

In another embodiment, the system 102 may be configured to receive positional information of the movable object from a device associated with the movable object. The device associated with the movable object may be a radio frequency identification (RFID) device that may be able to track a movement and other parameters associated with the movable device based on the receive positional information of the movable object. The RFID may be integrated within a device that may be associated with the movable object. For example, if the movable object is a human being, the RFID device may be integrated within a wearable device worn by the human being. The system 102 may be further configured to update the first virtual location of the published virtual object 122 in the XR environment 120 based on the received positional information. This may be useful in tracking objects such as kids in the playgrounds, vitals associated with athlete (based on sensor data captured by one or more sensors included in a device that may include the RFID and worn by the athlete) and the like. Details about the tracking of objects are provided in FIG. 6.

FIG. 5 is a diagram that illustrates exemplary second set of operations associated with the subscriber device 106 for providing information in extended reality environment, in accordance with an embodiment of the disclosure. FIG. 5 is explained in conjunction with elements from FIG. 1, FIG. 2, FIG. 3A, FIG. 3B, and FIG. 4. With reference to FIG. 5, there is shown a block diagram 500 that illustrates exemplary operations from 502A to 502F, as described herein. The exemplary operations illustrated in the block diagram 500 may start at 502A and may be performed by any computing system, apparatus, or device, such as by the system 102 of FIG. 1 or the processor 202 of FIG. 2. Although illustrated with discrete blocks, the exemplary operations associated with one or more blocks of the block diagram 500 may be divided into additional blocks, combined into fewer blocks, or eliminated, depending on the particular implementation.

The disclosed system may operate in two phases—a setup phase, and an operational phase. In the setup phase, the subscriber 114 may download the software application (hereinafter referred as "XR Application") on the subscriber device 106 associated with the subscriber 114. The XR application may be one of a mobile application, a web application, a desktop application, or a cloud application. For the sake of simplicity, the XR application may be considered as the mobile application that may be installed on the subscriber device 106. The subscriber 114 may be further required to activate the XR application by registering an account on the XR application. The subscriber 114 may be further required to adjust one or more settings within the XR application and complete a subscriber profile that may be associated with the subscriber 114. The subscriber 114 may further required to select a type of user for using the XR application from a set of user types on the subscriber device 106. The set of user types may include, but are not limited to, a publisher, a subscriber, or both publisher and subscriber. In an embodiment, the system 102 may be further configured to receive profile information from the subscriber device 106 via a user interface rendered in the XR application. The system 102 may be configured to generate a subscriber profile associated with the subscriber device 106 to register on the XR application based on the received profile information. In an embodiment, the subscriber 114 may select the user type as the "subscriber". After the selection of the user type, the setup phase may be completed and the system 102 may operate in the operational phase. In the operational phase, the exemplary operations from 502A to 502F may be executed.

At 502A, a data acquisition operation may be executed. In the data acquisition operation, the system 102 may be configured to receive a first subscriber input via the subscriber device 106 associated with the subscriber 114. The first subscriber input may be to view the set of virtual objects associated with one of one or more services or one or more objects of a set of real-world objects. In another embodiment, the first subscriber input may correspond to opening up the XR application on the subscriber device 106.

At 502B, the XR rendering operation may be executed. In the XR rendering operation, the system 102 may be configured to render the XR environment 120 on the subscriber device 106. In an embodiment, the XR environment 120 may be rendered on the subscriber device 106 via the XR application. Details about the XR environment 120 are provided, for example, in FIG. 1 and at 402B and 402C of FIG. 4.

At 502C, an image sensor control operation may be executed. In the image sensor control operation, the system 102 may be configured to control the image sensor to scan the physical environment 116 around the subscriber device 106 using the XR application based on the reception of the first subscriber input. The physical environment 116 may include a set of real-world objects (such as buildings, cars, houses etc.). The image sensor may be associated with the subscriber device 106. In an embodiment, the image sensor may be integrated within the subscriber device 106. In another embodiment, the image sensor may be a separate device from subscriber device 106 and may be communicatively coupled with the subscriber device 106.

The image sensor may include suitable logic, circuitry, and interfaces that may be configured to scan a physical environment 116 around the subscriber device 106. The physical environment 116 may include a set of real-world objects. The image sensor may include, but are not limited to, a depth sensor, a wide-angle camera, an action camera, a closed-circuit television (CCTV) camera, a camcorder, a digital camera, camera phones, a time-of-flight camera (ToF camera), a night-vision camera, and/or other image capture devices.

At 502D, a virtual objects retrieval operation may be executed. In the virtual objects retrieval operation, the system 102 may be configured to retrieve a set of virtual objects. The set of virtual objects may be associated with at least one of one or more services or one or more objects of the set of real-world objects. In an embodiment, the set of virtual objects may be retrieved from the database 108. The system 102 may be configured to determine a location associated with the physical environment 116 based on the set of real-world objects present at the location and retrieve the set of virtual objects associated with the determined location. In another embodiment, the system 102 may be configured to determine the location of the subscriber device 106. The system 102 may be configured to retrieve the set of virtual objects from the database 108 associated with the determined location.

In an example, each of the retrieved set of virtual objects may be created based on a set of first publisher inputs provided by a set of publishers from the plurality of publishers associated with the XR application. Each of the retrieved set of virtual objects may be associated with at least one service of the one or more services or one object of the one or more objects. Details about the creation of the set of virtual objects are provided, for example, at 402B in FIG. 4.

At 502E, a virtual objects rendering operation may be performed. In the virtual objects rendering operation, the system 102 may be configured to display the retrieved set of virtual objects. The retrieved set of virtual objects may be displayed at a first set of virtual locations in an XR environment 120. The first set of virtual locations may correspond to a physical location of at least one of the one or more services or the one or more objects of the set of real-world objects. In an embodiment, the set of virtual objects may be overlaid of the set of real-world objects present in the physical environment 116. Details about the set of virtual objects are provided, for example, in FIG. 6.

At 502F, a data filtering operation may be performed. In the data filtering operation, the system 102 may be configured to receive a second subscriber input to display one or more virtual objects of the set of virtual objects. Specifically, the second subscriber input may correspond to a selection of at least a first service of the one or more services or a first object of the one or more objects. For example, if the subscriber 116 wishes to view virtual objects associated with the real estate service, then the subscriber 116 may provide the second subscriber input that may correspond to the selection of the real estate service.

The one or more virtual objects of the set of virtual objects may be associated with the first service or the first object. The system 102 may be further configured to filter out the one or more virtual objects associated with the first service or the first object. In another embodiment, the system 102 may be configured to retrieve the one or more virtual objects based on the reception of the second subscriber input. The system 102 may be further configured to displaying the retrieved one or more virtual objects in the XR environment 120. The retrieved one or more virtual objects may be displayed via the subscriber device 106.

In an embodiment, the subscriber 114 may be further configured to buy, or trade one or more items associated with at least one of the one or more services or the one or more objects on the XR application. Details about the buying, or trading of the one or more items associated with at least one of the one or more services or the one or more objects on the XR application are provided at 402E-402F in FIG. 4.

FIG. 6 is a diagram that illustrates an exemplary scenario for providing information in the XR environment 120, in accordance with an embodiment of the disclosure. FIG. 6 is explained in conjunction with elements from FIGS. 1, 2, 3A, 3B, 4, and 5. With reference to FIG. 6, there is shown an exemplary scenario 600. There is further shown a subscriber device 602 on which an XR application may be executed. In the XR application, an XR environment 604 may be rendered. The XR environment 604 may include a set of objects that may correspond to a set or real word objects located at the location of the subscriber device 602. The set of objects may include a first object 606, a second object 608, a third object 610, a fourth object 612, a fifth object 614, and a sixth object 616. With reference to FIG. 6, there is further shown a set of virtual objects associated with the set of objects. The set of virtual objects may include a first virtual object 606A, a second virtual object 608A, a third virtual object 610A, a fourth virtual object 612A, and a fifth virtual object 614A. The first virtual object 606A may be associated with the first object 606, the second virtual object 608A may be associated with the second object 608, the third virtual object 610A may be associated with the third object 610, the fourth virtual object 612A may be associated with the first object 612, and the fifth virtual object 614A may be associated with the fifth object 614.

In an embodiment, the system 102 may be configured to render the XR application on the subscriber device 602. The system 102 may be further configured to control the image sensor to scan the physical environment 116 around the subscriber device 602 using the XR application. The physical environment 116 may include a set of real-world objects (or the set of objects). The system 102 may be further configured to retrieve the set of virtual objects associated with the set of objects corresponding to the set of real-world objects and display, on the subscriber device 602, the retrieved set of virtual objects at the first set of virtual locations in an XR environment 604.

By way of example and not limitation, the first object 606 may be a hotel and the first virtual object 606A associated with the first object 606 may display information associated with booking of hotel at a first virtual location 606B. The first virtual location 606C may be at the center of the first object 606 displayed in the XR environment 604 and associated with the hotel. In an embodiment, the first virtual object 606A may be displayed above a first pre-determined distance above the subscriber device 602. As an example, the first virtual object 606A may be displayed in the open air approximately 4 to 6 feet above the subscriber device 106.

The second object 608 may be a supermarket and the second virtual object 608A associated with the second object 608 may display information associated with an ongoing sale at the supermarket. The second virtual object 608A may be displayed at a second virtual location 608B. The third object 610 may be a car and the third virtual object 610A associated with the third object 610 may display information associated with an offer to buy the car. The third virtual object 610A may be displayed at a third virtual location 610B. Similarly, the fourth object 612 may be a government building and the fourth virtual object 612A associated with the fourth object 612 may display information associated with one or more services offered inside the government building. The fourth virtual object 612A may be displayed at a fourth virtual location 612B.

The fifth object 614 may be headquarters of an organization "ABC" and the fifth virtual object 614A associated with the fifth object 614 may display information indicating a name and a website the organization "ABC". The fifth virtual object 614A may be displayed at a fifth virtual location 614B. In an embodiment, the first virtual object 614A may be displayed above a second pre-determined distance above the subscriber device 602. As an example, the fifth virtual object 614A may be displayed in the open air approximately 15 to 20 feet above the subscriber device 106.

The above exemplary scenario may depict one application of the set of applications provided by the present disclosure. Other applications associated with a set of services and set of products of the present disclosure are provided below:
Real Estate/Blockchain-Based Digital Real Estate Whether digital or physical real estate, with the present system, the real estate owners and companies may be able to transmit listings (i.e. the virtual objects) above each location. As the subscriber 114 approaches the listings, they are able to hold their subscriber device 106 up towards the open air, sky, or the general direction of the listing and be presented with the broadcasted information about rentals, for sale, open house, or recently sold homes. Digital real estate is not a new concept, but the advent of contemporary blockchain technology forever altered the future of digital assets. Nowadays, blockchain-powered tech like cryptocurrency, virtual real estate, and NFTs have changed the way in which assets are managed in our digital world. It is evident that this will continue to fundamentally change how businesses function worldwide. With the ability to represent assets using a digital system and make transactions with blockchain technology, new markets are opening up for assets that would once have been considered illiquid. The disclosed system is able to advance the visibility of blockchain transaction events that could take place anywhere without the need of a website or domain to direct or redirect transactions.
Virtual Reality With the advancement in the field of VR, the future of digital real estate is using the VR. However, currently there is no technology that may be capable of creating a live and in-person transaction in the VR. The present disclosure changes that by providing information associated with services and objects in the XR environment 120 and being able to trade the digital real estate assets in the XR application only. The concept of augmented reality or virtual reality has been around for decades, but it is only within the past few years that these technologies, once thought of as Sci-Fi fodder, have become accessible to the masses. The present disclosure and its systems and XR application bring a new reality that bridges various metaverse transactions.

This new digital universe, dubbed "the Metaverse" by some, may catalyze a seismic shift in how people interact with technology and with each other. The metaverse includes the entire digital landscape that can be accessed through the internet and the VR technology. The present disclosure may overcome such prior limitations of the metaverse by transforming the metaverse into an actual transactional reality which the user can go in and out of as desired to transact or disseminate information. The subscribers may be able to broadcast information, while also transacting in-person. This may be the most critical advance for any live auction. The present system will always be on and available as transactions may be done directly via devices with cell connectivity, internet and broadcasting capabilities.

Though full potential of the metaverse has not been discovered yet, still the digital real estate in the virtual world has already begun to function in the same way that it does in the real world and has the same demands. For example, buyers want to be the first to be notified and sellers want the highest price they can get for the digital real-estate. This new digital economy opens up endless opportunities to create, market, buy, and sell digital assets via the presently disclosed system. As an example, a first virtual reality real estate company, The Metaverse Group®, was founded. The company set up its global headquarters in Crypto Valley in Decentraland. The Metaverse Group made their new home in Decentraland, a decentralized virtual reality platform. Decentraland provides an immersive three dimensional (3D) experience to explore digital worlds using VR goggles. The limitation is the requirement of goggles. The presently disclosed system does not require any goggles, just an open air or sky and a user's device with the XR application installed thereon.

All the digital real estate in Decentraland may be called as LAND and may be represented by NFTs. This is where the presently disclosed system plays a critical role to bring the NFT properties to publishers where they can instantly broadcast their properties and receive bids from subscribers. The subscribers may use a cryptocurrency, for example, MANA®, to buy them, which uses the Ethereum® blockchain and once they purchase digital real estate on the LAND marketplace.

Cruise Ships

The subscribers may be able to have all key locations on the ship displayed through the XR application by pointing their corresponding subscriber device to the open air or the sky. As such, the cruise ship may be able to provide a directory for the guests. For example, the emergency exits, the first aid locations, the restaurants, shopping, the entertainment venues, and all other directory and the map information may be displayed on the subscriber's device which is only viewable while on-board and may be protected by the geo-fencing.

Shopping Malls

The disclosed system may offer an augmented reality directory that may be displayed by a user (publisher/subscriber) holding their device towards the direction of interest, open air, or the sky. The system will present, for example, the name and direction to the stores or restaurants of interest.

Government

Examples of governmental use of the present disclosure would include, for example, search and rescue, disaster relief, deployment and extractions, and night operations. Usually during search and rescue operations, one of the toughest job is to find survivors, to find government properties, and to find government employees etc. The disclosed system may be helpful to find main gas lines or electrical lines that, as a result of an earthquake or fire, may be damaged. All of that information may be displayed based on information received from a transmitter (including an RFID). The government application information may be broadcasted 20 feet above the transmitter surface, which, in most cases, may be ideal height to find survivors.

Youth and Children

With the presently disclosed system, a user (a subscriber or a publisher) would be able to keep an eye on their children while at the playground or sport fields. What was previously a challenge to spot your child amongst many other children, with the XR application you will be able to spot their whereabouts in real time merely by pointing your device in the area. The disclosed system may receive positional information of the movable object (such as the children) from a device that may be associated with the movable object. In an embodiment, the device may correspond to a wearable device that may be worn by the children. The system may be further update the first virtual location of the published virtual object in the XR environment based on the received positional information. In an embodiment, the device associated with the movable object may be the RFID device.

Sports and Athletes

As discussed in the previous scenario, one or more athletes using the disclosed system may be able to transmit their information related to their vitals to their trainer. As such, their trainer may be able to monitor their progress and overall health live and on the spot. This will help in reduction of chances of injury and assist the athlete to compete and train at an optimal performance. While there are many devices that offer sensors and data transmission, with the presently disclosed system, such data is displayed in the XR space and without distraction to the athlete through the XR application installed on their trainer's device.

Sales and Marketing

For example, auto sales (personal and commercial), food and beverage, hospitality, hotels and resorts, restaurants and bars, retail stores and movie theaters. Items or services may be sold on-site by broadcasting the sale of the desired item or service to interested users.

Industrial

Power plants, refineries, equipment status report, plant operations, and equipment status reports may be presented via the system. This may be used by the equipment manufacturers and service maintenance providers. Other examples may include conventions, both by booths and participants to broadcast information to other users. For example, one could send a secure meeting invitation to a desired user, who would be able to accept the invitation for business or general meetings.

Recreation

The users of the system may be able to identify parks, hiking trails, river rafting sites, off-roading sites, motocross and dirt bike locations, street bike locations, skiing sites, cross country trails, swimming locations, parachuting and hang gliding venues, and identify the location of pets, babies, and children.

Dating

The user (publishers/subscribers) of the system may be able to identify blind date locations, or identify single individuals who may be interested to meet at the current location and receive requests to meet on the spot. The user may be able to accept or reject requests to meet. Other examples may include couples that want to meet other couples, or the occurrence of corporate events.

Automobile and Airplane Manufacturers

Sales and service centers and maintenance providers as well as end-users or owners can easily view the status of the vehicle or aircraft through the XR application, which can display information above the subject system to determine the performance or a maintenance need of the subject system.

Appliances

Service and maintenance providers as well as end-users or owners can easily view the status of the system through the XR application. The XR application may be capable of displaying information above the subject system to determine the performance or a maintenance need of the system.

Rentals

The users and providers may be able to track and review the maintenance need of the rented equipment, including but not limited to cars, motorcycle and bikes.

Uber or Lifts and Other Ridesharing Services

The users may be able to easily identify an exact location and verified passengers/drivers when using the system, which will increase the safety for both the driver and the passenger.

Agriculture, Organic Farming, and Hydroponics

There is a constantly growing pressure on food producers, and the shift toward precision farming techniques is becoming vital due to the ever-changing circumstances. A lot of farms have been in the same state for years and years. Some farmers have not made any significant changes because they did not see the point in doing so. As a result, the state of many farms is less than satisfactory from a technical perspective. A farm may not be ready for a technological makeover right now, but if its owners are eager to stay profitable in the future, they will need to find a way to start implementing technologies.

For example, some of the technologies can provide a combination of historical weather reports and future forecasts, as well as information about the state of the field and crops in the past and present times. The platform processes satellite data, supplying farmers with unlimited natural color imagery and a Normalized difference vegetation index (NDVI) imagery. All of this may allow farmers to get access to remote control, understand what they need to do to grow crops of higher quality, while using their resources more efficiently, reduce scouting expenses, and receive weather risk alerts. But none of the current technologies can provide the live-status reporting of the presently disclosed system, where the exact selected information may be displayed for the farmer above each lot to ensure the inputted information is in an active state of supply to the crop.

Modern agriculture has many complex challenges and may be unpredictable. And while modern agriculture provides a number of solutions, the outcome is not always the same because each farm is unique with different landscapes, soils, available technology, and potential yields. Conventional farmers take advantage of the latest scientific and agricultural technological advances meant for greater efficiency and high output, including chemical and synthetic pesticides and fertilizers, mono-cropping, genetic-engineering and modification (in seeds and breeds) and antibiotic and hormone use in livestock. However, due to the lack of live status reporting and monitoring, many of their efforts may not produce optimal results, the presently disclosed system may change that for the users as each section of the farm could display a constant report that is viewable via the XR application when held towards the desired direction.

The lack of technology availability in agriculture is a well-known challenge and thus makes farmers more vulnerable to critically unknown risks that spreads across their crops. Some of these challenges are not readily visible until damage is done, including but not limited to water and nutrients, bugs, funguses, animals, climate, soil erosion, and biodiversity loss. With the presently disclosed system, a farmer can simply hold their device towards the desired direction of his farming area and view the desired or preselected status live. As such, if there are any signs of issues, the farmer will have a specific location and advanced knowledge of the issue, thus making farming proactive and less susceptible to the risk of damaged crops.

Aeronautical and Space Industry and Radio-Controlled Aircrafts—Government and Hobbyist Many traffic or on the ground accidents happen due to congested airports and lack of visibility by the control tower, pilots, and on the ground staff which all poses tremendous amounts of risk. The presently disclosed system may change that by bringing added visibility that is displayed above each aircraft and, once in motion, the display color above the moving aircraft will change to red expressing aircraft in motion and orange if it's about to move and green while in the park position.

The same benefits may be offered for hot air balloon pilots and ground staff that will have to follow and find the landing area, as well as passengers to identify the direction and name of the vessel and pilot. Another benefit for those that enjoy and/or compete in radio-controlled airplane, drone, or kite competitions, is that a user can easily display and identify desired information via the mobile app. The displayed information will also help the judges to follow each of the contenders with a clearer view.

Other Planets, Residential, Commercial and Travelers

Human travelers to Mars will require shelter from the harsh environment. To help generate ideas for how to build those Martian habitats, NASA® recently awarded over $200,000 to citizen inventors working to create 3D-printable structures from recyclable materials and simulated Martian soil. Supporting the presently disclosed system's usability on other planets, it is important to know that the teams are competing in NASA's 3D-Printed Habitat Challenge, which may now in its second phase. The latest milestone required participants to print a structural beam that would undergo bend testing, with scores based on the use of recycled material or material like that found on Mars, and on the maximum load that the beam could support. These competitors are working with NASA® to advance critical systems needed for human space exploration and living. The system disclosed herein can be used for the identification of different areas and marked landings. However, as living in space and housing in Mars or other planets has become a reality, this system could provide various other technological advancement for the visitors or the residence of subject planets.

Space Farming

International organizations are devoting time and resources to the development of sustaining human life beyond Earth. Some of the space programs goals include the upcoming return to, and eventual settlement of the moon, along with the pending manned voyages to Mars. Though plants can live with little gravity, it's best for them to have at least a small amount to prevent any growth problems. Artificial gravity, produced by a mechanical centrifuge, helps solve this problem. Experiments that control the amount and duration of artificial gravity help researchers determine how much gravity affects the direction of root growth. Luckily, the moon and Mars both have some level of gravity, which may aid in sustaining plant life on these celestial bodies. The presently disclosed system can provide various uses to provide and display critical space farming information above the crop that is visible to the residence and or astronauts to decide on the status of their farming.

Automobile, Motorcycle and Bicycle

Races of all types all have one thing in common for the viewers, namely, the location and physical status of the viewers' favorite competitors, the top 3 spots, and live stats. Through the XR application, users can easily spot and follow this desired information.

Live and In-Person Spotting and Trading of NFTs

Users can send and receive notices or request to sell or buy Non-Fungible Tokens, or NFTs, in addition to digital properties including but not limited to art pieces, real estate and other digital properties, and items that are designed for by/sale/exchange in metaverse space. The NFTs are pieces of digital content linked to the blockchain, the digital database underpinning cryptocurrencies such as Bitcoin® and Ethereum®. Unlike NFTs, those assets are fungible, meaning they can be replaced or exchanged with another identical one of the same value, much like a dollar bill, this can happen live and in person as seller can broadcast its asset and accept/deny request to meet or exchange in person and or on spot. NFTs are cryptographic tokens that can represent a unique product like a piece of music, a work of art, or an item in a video game. This digital token essentially certifies ownership and can be verified digitally using blockchain. Investing in an NFT guarantees ownership of the digital assets and means that no one else can duplicate or sell them without your consent. They are sort of like virtual certificates of ownership.

FIG. 7 is a flowchart that illustrates an exemplary method for providing information in extended reality environment for at least one publisher, in accordance with an embodiment of the disclosure. FIG. 7 is explained in conjunction with elements from FIGS. 1, 2, 3A, 3B, 4, 5, and 6. With reference to FIG. 7, there is shown a flowchart 700. The operations of the exemplary method may be executed by any computing system, for example, by the system 102 of FIG. 1 or the processor 202 of FIG. 2. The operations of the flowchart 700 may start at 702.

At 702, the first publisher input may be received. The first publisher input may be received via the publisher device 104, or the display screen 306A associated with publisher device 104. The first publisher input may include at least location information, and first information associated with at least one of the service or the object 118. In accordance with an embodiment, the processor 202 may be configured to receive the first publisher input via the publisher device 104, wherein the first publisher input may include at least the location information, and the first information associated with at least one of the service or the object 118. Details about the first publisher input are provided, for example, in FIGS. 1 and 4.

At 704, the virtual object 122 may be created. The virtual object 122 may be created based on the received first information. The created virtual object 122 may have to be rendered in the XR environment 120 corresponding to the physical environment 116 that may include a location specified in the location information. In accordance with an embodiment, the processor 202 may be configured to create the virtual object 122 based on the first information, wherein the created virtual object 122 is to be rendered in the XR environment 120 corresponding to the physical environment 116 that includes the location specified in the location information. Details about the virtual object 122 and XR environment 120 are provided, for example, in FIGS. 1 and 4.

At 706, the created virtual object 122 may be published. The created virtual object 122 may be published at a first virtual location in the XR environment 120 to be viewed by a subscriber device 106. The first virtual location may correspond to the location specified in the location information. In accordance with an embodiment, the processor 202 may be configured to publish the created virtual object 122 at the first virtual location in the XR environment 120 to be viewed by the subscriber device 106, wherein the first virtual location may correspond to the location specified in the location information. Details about the virtual object and XR environment 120 are provided, for example, in FIGS. 1 and 4. Control may pass to end.

The method 700 may be implemented using a corresponding processor. For example, the method 700 may be implemented by an apparatus or system comprising a processor, a memory, and a network interface of the kind discussed in conjunction with FIG. 2.

FIG. 8 is a flowchart that illustrates an exemplary method for providing information in extended reality environment for at least one subscriber, in accordance with an embodiment of the disclosure. FIG. 8 is explained in conjunction with elements from FIGS. 1, 2, 3A, 3B, 4, 5, 6, and 7. With reference to FIG. 8, there is shown a flowchart 800. The operations of the exemplary method may be executed by any computing system, for example, by the system 102 of FIG. 1 or the processor 202 of FIG. 2. The operations of the flowchart 800 may start at 802.

At 802, the XR application may be rendered on the subscriber device 106. In accordance with an embodiment, the processor 202 may be configured to render the XR application on the subscriber device 106. Details about the XR environment are provided, for example, in FIGS. 1, 4, and 5.

At 804, the image sensor may be controlled. The image sensor may be controlled to scan the physical environment 116 around the subscriber device 106 using the XR application. The physical environment may include a set of real-world objects. In accordance with an embodiment, the processor 202 may be configured to control the image sensor to scan the physical environment 116 around the subscriber device 106 using the XR application, wherein the physical environment includes the set of real-world objects. Details about controlling the image sensor are provided, for example, in FIG. 5.

At 806, the set of virtual objects may be retrieved. The set of virtual objects may be associated with at least one of one or more services or one or more objects of the set of real-world objects. In accordance with an embodiment, the processor 202 may be configured to retrieve the set of virtual objects associated with at least one of the one or more services or the one or more objects of the set of real-world objects. Details about the retrieved set of virtual objects are provided, for example, in FIG. 5.

At 808, the retrieved set of virtual objects may be displayed. The set of virtual objects may be displayed, on the subscriber device 106, at a first set of virtual locations in the XR environment 120. In accordance with an embodiment, the processor 202 may be configured to display, on the subscriber device 106, the retrieved set of virtual objects at the first set of virtual locations in the XR environment 120. Control may pass to end.

The method 800 may be implemented using a corresponding processor. For example, the method 800 may be implemented by an apparatus or system comprising a processor, a memory, and a network interface of the kind discussed in conjunction with FIG. 2.

Various embodiments of the disclosure may provide a non-transitory computer readable medium and/or storage medium having stored thereon, instructions executable by a machine and/or a computer to operate a system (e.g., the system 102) for proving services in XR environment. The instructions may cause the machine and/or computer to perform operations that include receiving the first publisher input from the publisher device 104, wherein the first publisher input includes at least location information, and first information associated with at least one of the service or the object 118. The operations further include creating the virtual object 122 based on the first information, wherein the created virtual object 122 is to be rendered in the extended reality (XR) environment 120 corresponding to the physical environment 116 that includes the location specified in the location information. The operations further include publishing the created virtual object 122 at a first virtual location in the XR environment 120 to be viewed by the subscriber 114, wherein the first virtual location corresponds to the location specified in the location information.

Various embodiments of the disclosure may provide a non-transitory computer readable medium and/or storage medium having stored thereon, instructions executable by a machine and/or a computer to operate a system (e.g., the system 102) for proving services in XR environment. The instructions may cause the machine and/or computer to perform operations that include rendering an extended reality (XR) application on the subscriber device 106. The operations further include controlling the image sensor to scan the physical environment 116 around the subscriber device 106 using the XR application, wherein the physical environment 116 includes a set of real-world objects. The operations further include retrieving a set of virtual objects associated with at least one of one or more services or one or more objects of the set of real-world objects. The operations further include displaying, on the subscriber device 106, the retrieved set of virtual objects at a first set of virtual locations in the XR environment 120.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions.

The present disclosure may also be embedded in a computer program product, which includes all the features that enable the implementation of the methods described herein, and which, when loaded in a computer system, is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made, and equivalents may be substituted without deviation from the scope of the present disclosure. In addition, many modifications may be made to adapt a particular situation or material to the teachings of the present disclosure without deviation from its scope. For example, the present disclosure can allow for transactions between users without Internet access by utilizing, for example, Bluetooth, local hotspots, smartphone hotspots and/or Application Programming Interfaces (API) and encrypted secure messaging within the app. The User Interface (UI) may further feature an app-to-app communication platform to allows users to exchange data between apps on a device, even if the device is offline. These app-to-app communications may include both inbound requests ("calls") and outbound ("callbacks") to an allowed domain or app. Therefore, it is intended that the present disclosure is not limited to the particular embodiment disclosed, but that the present disclosure will include all embodiments falling within the scope of the appended claims.

We claim:

1. A system comprising:
a processor;
a memory communicatively coupled to the processor, wherein the memory stores a plurality of processor-executable instructions which upon execution by the processor cause the processor to:
    receive a first publisher input via a publisher device, wherein the first publisher input comprises at least location information and first information associated with at least one of: a service or an object;
    create a virtual object based on the received first information, wherein the created virtual object is to be rendered in an extended reality (XR) environment corresponding to a physical environment that includes a location specified in the location information; and
    publish the created virtual object at a first virtual location in the XR environment to be viewed via a subscriber device, wherein the first virtual location corresponds to the location specified in the location information,
wherein the processor is configured to:
    provide a user interface (UI) via an XR application, to render the XR environment on the publisher device;
    publish the created virtual object at the first virtual location in the XR environment, based on reception of a first input via an on-air UI element of the UI; and
    unpublish the published virtual object from the first virtual location in the XR environment, based on reception of a second input via an off-air UI element of the UI.

2. The system according to claim 1, wherein the provided UI further comprises a text box UI element to receive the first information as a textual input.

3. The system according to claim 1, wherein the provided UI further comprises a private messaging UI element, and wherein the processor is configured to:

render a private information window on the UI based on selection of the private messaging UI element;

receive a second publisher input to select at least one of: one or more subscribers of a plurality of subscribers and a first time period, via the rendered private information window, wherein the one or more subscribers are authorized to view the created virtual object; and publish the created virtual object at the first virtual location for the selected one or more subscribers for the first time period.

4. The system according to claim 3, wherein the provided UI further comprises a public messaging UI element, and wherein the processor is configured to:

render a public information window on the UI based on selection of the public messaging UI element;

receive the second publisher input to select the first time period via the rendered public information window; and publish the created virtual object at the first virtual location for the plurality of subscribers for the first time period.

5. A system comprising:

a processor;

a memory communicatively coupled to the processor, wherein the memory stores a plurality of processor-executable instructions which upon execution by the processor cause the processor to:

receive a first publisher input via a publisher device, wherein the first publisher input comprises at least location information and first information associated with at least one of: a service or an object;

create a virtual object based on the received first information, wherein the created virtual object is to be rendered in an extended reality (XR) environment corresponding to a physical environment that includes a location specified in the location information; and publish the created virtual object at a first virtual location in the XR environment to be viewed via a subscriber device, wherein the first virtual location corresponds to the location specified in the location information;

wherein the processor is further configured to:

receive, via a subscriber device associated with a subscriber, a first subscriber input associated with a selection of the published virtual object; and display information associated with the subscriber device on the publisher device associated with a publisher, based on the reception of the first subscriber input transmit a payment notification to the subscriber device based on the reception of the first subscriber input, wherein the payment notification includes a first amount to be paid for at least one of the service or the object associated with the created virtual object; and receive a payment confirmation notification from the subscriber device, wherein the payment confirmation notification indicates a successful payment of the first amount is completed using one of: a cryptocurrency or a fiat currency.

\* \* \* \* \*